United States Patent
Kondo

(10) Patent No.: US 10,333,428 B2
(45) Date of Patent: Jun. 25, 2019

(54) RESONANT LOAD POWER CONVERSION DEVICE AND TIME DIVISION OPERATION METHOD FOR RESONANT LOAD POWER CONVERSION DEVICE

(71) Applicant: MEIDENSHA CORPORATION, Tokyo (JP)

(72) Inventor: Yasuhiro Kondo, Numazu (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/062,890

(22) PCT Filed: Nov. 16, 2016

(86) PCT No.: PCT/JP2016/083891
§ 371 (c)(1),
(2) Date: Jun. 15, 2018

(87) PCT Pub. No.: WO2017/104337
PCT Pub. Date: Jun. 22, 2017

(65) Prior Publication Data
US 2018/0375442 A1 Dec. 27, 2018

(30) Foreign Application Priority Data

Dec. 16, 2015 (JP) .................. 2015-245400

(51) Int. Cl.
*H02M 7/5387* (2007.01)
*H02M 7/48* (2007.01)
(Continued)

(52) U.S. Cl.
CPC .......... *H02M 7/5387* (2013.01); *H02M 7/48* (2013.01); *H05B 6/10* (2013.01); *H02M 3/24* (2013.01); *H02M 2007/4815* (2013.01)

(58) Field of Classification Search
CPC ........ H02M 7/007; H02M 7/48; H02M 7/525; H02M 7/537; H02M 7/538; H02M 7/5387;
(Continued)

(56) References Cited

U.S. PATENT DOCUMENTS

| | | | |
|---|---|---|---|
| 6,842,355 B2 | 1/2005 | Kleveland | |
| 7,499,290 B1* | 3/2009 | Mazzola | H02M 3/33569 363/17 |

(Continued)

FOREIGN PATENT DOCUMENTS

| | | |
|---|---|---|
| CN | 106464159 A | 2/2017 |
| JP | 55-8278 A | 1/1980 |

(Continued)

OTHER PUBLICATIONS

Chinese Office Action and English Translation, dated Jan. 24, 2019, 17 pages.

*Primary Examiner* — Yemane Mehari
(74) *Attorney, Agent, or Firm* — Foley & Lardner LLP

(57) ABSTRACT

Present invention provides resonant load power conversion device capable of decreasing switching frequency of each switching element and reducing the number of main circuit conductors. Resonant load power conversion device has single-phase inverter whose DC input side (Vdc) is connected to DC voltage source and whose output side (Vout) is connected to resonant load and which outputs rectangular wave voltage at resonance frequency. Resonant load power conversion device includes switch group circuits 100U, 100V, 100X, 100Y connected to respective upper and lower arms of input and output sides of single-phase inverter and configured so that N (N=integer of 2 or more) series bodies each having 2 switching elements are connected parallel by main circuit conductors, and controller switching each switching element (U11 to U32, V11 to V32, X11 to X32, Y11 to Y32) of switch group circuits 100U, 100V, 100X, 100Y by time division of 1/(M×N).

6 Claims, 9 Drawing Sheets

INVERTER SECTION OF EMBODIMENT 2

(51) Int. Cl.
*H05B 6/10* (2006.01)
*H02M 3/24* (2006.01)

(58) Field of Classification Search
CPC .... H02M 3/24; H02M 3/33507; H02M 3/337; H02M 3/3376; H02M 1/32; H02M 1/34; H02M 2001/0032; H05B 6/10
USPC ............. 363/17, 56.05, 95, 97, 98, 131, 132
See application file for complete search history.

(56) References Cited

U.S. PATENT DOCUMENTS

| | | | | |
|---|---|---|---|---|
| 9,178,410 | B2* | 11/2015 | Schelenz | H02M 1/088 |
| 9,812,943 | B2* | 11/2017 | Kondo | H02M 7/537 |
| 2003/0179595 | A1* | 9/2003 | Kleveland | H02M 7/493 363/132 |
| 2013/0049471 | A1* | 2/2013 | Oleynik | H02J 3/01 307/65 |
| 2014/0098586 | A1* | 4/2014 | Jeong | H02M 1/08 363/131 |
| 2017/0133920 | A1 | 5/2017 | Kondo | |
| 2018/0175847 | A1* | 6/2018 | Morokuma | H02M 1/08 |

FOREIGN PATENT DOCUMENTS

| | | |
|---|---|---|
| JP | 58-75481 A | 5/1983 |
| JP | 05-83947 A | 4/1993 |
| JP | 10-243660 A | 9/1998 |
| JP | 2004-510400 A | 4/2004 |

\* cited by examiner

INVERTER SECTION OF EMBODIMENT 1

PATTERN (1)

PATTERN (2)

PATTERN (3)

PATTERN (4)

PATTERN (5)

PATTERN (6)

OUTPUT CURRENT CORRESPONDING TO GATE COMMAND SIGNAL GENERATING PATTERNS (1) TO (6) OF EMBODIMENT 1

PATTERN (7)

PATTERN (8)

PATTERN (9)

PATTERN (10)

PATTERN (11)

PATTERN (12)

OUTPUT CURRENT CORRESPONDING TO GATE COMMAND SIGNAL GENERATING PATTERNS (7) TO (12) OF EMBODIMENT 1

INVERTER SECTION OF EMBODIMENT 2

CIRCUIT CONFIGURATION OF AC-DC CONVERSION DEVICE CONNECTED TO RESONANT LOAD

CIRCUIT OF INVERTER SECTION (3 PARARELL CONFIGURATION) OF MODIFIED EXAMPLE OF PRIOR ART

GATE COMMAND SIGNAL GENERATING PATTERN OF MODIFIED EXAMPLE OF PRIOR ART

PATTERN (1)

PATTERN (2)

PATTERN (3)

PATTERN (4)

PATTERN (5)

PATTERN (6)

OUTPUT CURRENT CORRESPONDING TO GATE COMMAND SIGNAL
GENERATING PATTERNS (1) TO (6) OF MODIFIED EXAMPLE OF PRIOR ART

RESONANT LOAD POWER CONVERSION DEVICE AND TIME DIVISION OPERATION METHOD FOR RESONANT LOAD POWER CONVERSION DEVICE

TECHNICAL FIELD

The present invention relates to a resonant load power conversion device that provides a rectangular wave voltage to a resonant load such as an induction heating circuit.

BACKGROUND ART

FIG. 7 shows a circuit configuration of a resonant load power conversion device (an AC-DC conversion device) connected to a resonant load. In FIG. 7, the AC-DC conversion device 10 has a single-phase inverter whose input side is connected to a DC voltage source 11 and whose output side is connected to the resonant load 12 such as an induction heating circuit. By performing ON/OFF control of each switching element of this single-phase inverter, the AC-DC conversion device 10 outputs a rectangular wave voltage of resonance frequency to the resonant load 12 (the AC-DC conversion device 10 outputs a rectangular wave voltage to the resonant load 12 at resonance frequency).

In a case where the resonant load 12 is the induction heating circuit, the AC-DC conversion device 10 is configured as an induction heating resonant load AC-DC conversion device (an induction heating resonant type inverter).

This induction heating resonant load AC-DC conversion device is configured so that an alternating current generated by the ON/OFF control of each switching element of the single-phase inverter flows in an LC resonance circuit formed by a coil and a capacitor, an eddy current flows in a heating part (an electric conductor) by an alternating field, which is generated by the flow of the alternating current, being provided to the heating part (the electric conductor), and the LC resonance circuit is heated from an inside of the LC resonance circuit by Joule heat generated by the flow of the eddy current.

Regarding the induction heating circuit as the resonant load connected to the output side of the resonant load power conversion device (e.g. the AC-DC conversion device 10 in FIG. 7), it has been known that the higher the frequency is, the more the depth of penetration of current is decreased.

Since an electro-resistance-welded tube joint (a joint of a tube is connected by electric resistance welding for forming the tube) is performed by surface quenching (surface hardening), the resonant load AC-DC conversion device used for the induction heating is required to be able to output high frequency voltage.

On the other hand, the switching element of the resonant load AC-DC conversion device used for the induction heating has an upper limit of a drive frequency. Therefore, the resonant load AC-DC conversion device has a problem of failing to respond to a voltage frequency that is higher than the drive frequency of the switching element.

As a prior art that solves this problem, for instance, a resonant load inverter system disclosed in Patent Document 1 has been proposed. As disclosed in FIG. 3 and pars. [0007] to [0009] in this Patent Document 1, by dividing the single-phase inverter into n sections (by N-parallel connecting the single-phase inverter), the switching element can be driven at a 1/N period. As a consequence, the drive frequency of the switching element can be decreased to a frequency that is inversely proportional to the number of parallel connection with respect to a desired resonance frequency.

Further, as a modified example of the resonant load inverter system of Patent Document 1, for instance, as shown in FIG. 8, it can be conceivable that the switching elements (e.g. IGBTs) per one arm of the single-phase inverter will be configured to be connected in N parallel.

FIG. 8 shows the resonant load AC-DC conversion device, e.g. a device used for the AC-DC conversion device 10 shown in FIG. 7. The resonant load AC-DC conversion device has a DC link voltage input section Vdc, a rectangular wave voltage output section Vout, and a single-phase inverter in which N-parallel switching elements per one arm (here, 3 parallel) (U11, U21, U31, V11, V21, V31, X11, X21, C31, and Y11, Y21, Y31) are connected.

As shown in FIG. 8, by increasing the number N of the parallel-connected switching elements per one arm, as same as the resonant load inverter system disclosed in Patent Document 1, it is possible to decrease the switching frequency per one switching element.

Each switching element in FIG. 8 is ON/OFF-controlled along a gate command signal generating pattern shown in FIG. 9.

The gate command signal generating pattern of FIG. 9 is formed from
   a clock with ON and OFF of an output voltage command (Vout_ref) of the single-phase inverter being a trigger,
   a switching element U11 and Y11 gate command signal U11_gate/Y11_gate with 6 clocks being one period (one cycle) and with an ON signal being outputted at 1 clock and an OFF signal being outputted at 5 clocks,
   a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate,
   a switching element U21 and Y21 gate command signal U21_gate/Y21_gate that is delayed by 1 clock with respect to the gate command signal X11_gate/V11_gate and has the same ON and OFF periods as ON and OFF periods of the gate command signal X11_gate/V11_gate,
   a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate,
   a switching element U31 and Y31 gate command signal U31_gate/Y31_gate that is delayed by 1 clock with respect to the gate command signal X21_gate/V21_gate and has the same ON and OFF periods as ON and OFF periods of the gate command signal X21_gate/V21_gate, and
   a switching element X31 and V31 gate command signal X31_gate/V31_gate that is delayed by 1 clock with respect to the gate command signal U31_gate/Y31_gate and has the same ON and OFF periods as ON and OFF periods of the gate command signal U31_gate/Y31_gate.

Each switching element in FIG. 8 is ON/OFF-controlled by each generated gate command signal of U11_gate/Y11_gate . . . X31_gate/V31_gate with patterns (1) to (6) shown in FIGS. 10A to 10F being repeated.

A relationship of an output current when driving each switching element in FIG. 8 by the gate command signal generating pattern shown in FIG. 9 is illustrated in FIGS. 10A to 10F.

FIGS. 10A to 10F correspond to the patterns (1) to (6) of FIG. 9. In FIGS. 10A to 10F, the switching element that is ON-controlled by the ON signal of the gate command is indicated by "ON", and a route of an output current Iout passing through the ON-controlled switching element and a load is shown by an arrow.

According to FIGS. 9 and 10A to 10F, by switching each switching element sequentially by the patterns (1) to (6), it can be understood that a frequency index of the switching frequency (the drive frequency) per one switching element is 1/3 (1/N).

CITATION LIST

Patent Document

Patent Document 1: Japanese Unexamined Patent Application Publication No. 2004-510400

SUMMARY OF THE INVENTION

As described above, the switching frequency can be 1/N in the system of Patent Document 1 and the circuit configuration shown in FIGS. 10A to 10F. However, as shown by the gate command signal generating pattern of FIG. 9, since a pulse width of each signal of the gate command signal U11_gate/Y11_gate . . . gate command signal X31_gate/V31_gate is a width of one clock, the upper limit of an output frequency is determined by a minimum pulse width based on element characteristics by a turn-on rise time and a turn-off fall time of the switching element.

Further, the circuit configuration of the system of Patent Document 1 needs the number of main circuit conductor (leadwire) that connects the switching elements between the single-phase inverters (the n sections) which is proportional to the number N of the parallel connection. Also, the circuit configuration shown in FIGS. 10A to 10F needs the number of main circuit conductor (lead wire) that connects the switching elements in the single-phase inverter which is proportional to the number N of the parallel connection. Furthermore, the circuit configurations shown in Patent Document 1 and FIGS. 10A to 10F each need the number of main circuit conductor (the number N of the parallel connection×4 arms=4N main circuit conductors are needed), which is the same number as that of the switching element, between the DC link voltage input section Vdc and a DC input side terminal of each switching element of the upper and lower arms and between the rectangular wave voltage output section Vout and an output side terminal of each switching element of the upper and lower arms. Because of this, there arise problems of increasing cost of the main circuit conductor in proportion to the number N of the parallel connection and increasing an arrangement space of the main circuit conductor.

In addition, due to the fact that an arrangement of the switching element is increased in proportion to the number of the switching element and a difference of a route length of the main circuit conductor is increased, variations in impedance due to the route length of the main circuit conductor are also increased. As a consequence, as problems, a position shift of a zero-cross point of current passing through the main circuit conductor occurs, and current passing through a snubber circuit (not shown) that is connected to each switching element is increased, then loss is increased. Also, the switching element might be broken due to the increase in the snubber current.

Besides solving the above problems, it has been desired to further decrease the switching frequency per one switching element.

The present invention was made in view of the above technical problems. An object of the present invention is therefore to provide a resonant load power conversion device and a time division operation method of the resonant load power conversion device which are capable of decreasing the switching frequency of each switching element and reducing the number of the main circuit conductors between the DC link voltage input section Vdc and the DC input side terminal of each switching element of the upper and lower arms and between the rectangular wave voltage output section Vout and the output side terminal of each switching element of the upper and lower arms.

A resonant load power conversion device having a single-phase inverter whose DC input side is connected to a DC voltage source and whose output side is connected to a resonant load and which outputs a rectangular wave voltage at resonance frequency, to solve the above problems, described in claim 1, comprises: switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein, the switch group circuit of the upper arm, which is the one phase of the single-phase inverter, has a first series body in which two switching elements of U11 and U12 are connected in series, a second series body in which two switching elements of U21 and U22 are connected in series and a third series body in which two switching elements of U31 and U32 are connected in series, and the switch group circuit is configured so that the three series bodies of the first to third series bodies are connected parallel by the main circuit conductors, the switch group circuit of the lower arm, which is the one phase of the single-phase inverter, has a first series body in which two switching elements of X11 and X12 are connected in series, a second series body in which two switching elements of X21 and X22 are connected in series and a third series body in which two switching elements of X31 and X32 are connected in series, and the switch group circuit is configured so that the three series bodies of the first to third series bodies are connected parallel by the main circuit conductors, the switch group circuit of the upper arm, which is the other phase of the single-phase inverter, has a first series body in which two switching elements of V11 and V12 are connected in series, a second series body in which two switching elements of V21 and V22 are connected in series and a third series body in which two switching elements of V31 and V32 are connected in series, and the switch group circuit is configured so that the three series bodies of the first to third series bodies are connected parallel by the main circuit conductors, and the switch group circuit of the lower arm, which is the other phase of the single-phase inverter, has a first series body in which two switching elements of Y11 and Y12 are connected in series, a second series body in which two switching elements of Y21 and Y22 are connected in series and a third series body in which two switching elements of Y31 and Y32 are connected in series, and the switch group circuit is configured so that the three series bodies of the first to third series bodies are connected parallel by the main circuit conductors; and a controller that performs switching control of each switching element of the switch group circuits of the single-phase inverter by time division of 1/(M×N), and has a gate command generator that generates a clock with ON and OFF of an output voltage command of the single-phase inverter being a trigger, a switching element U11 and Y11 gate command signal with (2×2(=the number M of series connection)×3 (the number N of parallel connection)) clocks being one cycle and with an ON signal being outputted for a period of (2×3 (=the number N of parallel connection)×1 (=the number M of series connection−1)+1) clocks and an OFF signal being outputted for a period of [(2×2 (=the number M of series connection)×3 (=the number N of parallel connection))−(2×3(=the number N of parallel connection)×1(=the number M of series connection−1)+1)] clocks, a switching element X11 and V11 gate command signal that is delayed by 1 clock with respect to the switching element U11 and Y11 gate command signal and has the same ON and OFF periods as ON and OFF periods of the switching element U11 and Y11 gate command signal, a switching element U21 and Y21 gate command signal that is delayed by 1 clock with respect to the switching element X11 and V11 gate command signal and has the same ON and OFF periods as ON and OFF periods of the switching element X11 and V11 gate command signal, a switching element X21 and V21 gate command signal that is delayed by 1 clock with respect to the switching element U21 and Y21 gate command signal and has the same ON and OFF periods as ON and OFF periods of the switching element U21 and Y21 gate command signal, a switching element U31 and Y31 gate command signal that is delayed by 1 clock with respect to the switching element X21 and V21 gate command signal and has the same ON and OFF periods as ON and OFF periods of the switching element X21 and V21 gate command signal, a switching element X31 and V31 gate command signal that is delayed by 1 clock with respect to the switching element U31 and Y31 gate command signal and has the same ON and OFF periods as ON and OFF periods of the switching element U31 and Y31 gate command signal, a switching element U12 and Y12 gate command signal that is delayed by 1 clock with respect to the switching element X31 and V31 gate command signal and has the same ON and OFF periods as ON and OFF periods of the switching element X31 and V31 gate command signal, a switching element X12 and V12 gate command signal that is delayed by 1 clock with respect to the switching element U12 and Y12 gate command signal and has the same ON and OFF periods as ON and OFF periods of the switching element U12 and Y12 gate command signal, a switching element U22 and Y22 gate command signal that is delayed by 1 clock with respect to the switching element X12 and V12 gate command signal and has the same ON and OFF periods as ON and OFF periods of the switching element X12 and V12 gate command signal, a switching element X22 and V22 gate command signal that is delayed by 1 clock with respect to the switching element U22 and Y22 gate command signal and has the same ON and OFF periods as ON and OFF periods of the switching element U22 and Y22 gate command signal, a switching element U32 and Y32 gate command signal that is delayed by 1 clock with respect to the switching element X22 and V22 gate command signal and has the same ON and OFF periods as ON and OFF periods of the switching element U32 and V22 gate command signal, and a switching element X32 and V32 gate command signal that is delayed by 1 clock with respect to the switching element U32 and Y32 gate command signal and has the same ON and OFF periods as ON and OFF periods of the switching element U32 and Y32 gate command signal, and wherein each of the switching elements is ON/OFF-controlled by each of the generated gate command signals.

A time division operation method of a resonant load power conversion device having a single-phase inverter whose DC input side is connected to a DC voltage source and whose output side is connected to a resonant load and which outputs a rectangular wave voltage at resonance frequency, described in claim 4, the resonant load power conversion device includes: switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein, the switch group circuit of the upper arm, which is the one phase of the single-phase inverter, has a first series body in which two switching elements of U11 and U12 are connected in series, a second series body in which two switching elements of U21 and U22 are connected in series and a third series body in which two switching elements of U31 and U32 are connected in series, and the switch group circuit is configured so that the three series bodies of the first to third series bodies are connected parallel by the main circuit conductors, the switch group circuit of the lower arm, which is the one phase of the single-phase inverter, has a first series body in which two switching elements of X11 and X12 are connected in series, a second series body in which two switching elements of X21 and X22 are connected in series and a third series body in which two switching elements of X31 and X32 are connected in series, and the switch group circuit is configured so that the three series bodies of the first to third series bodies are connected parallel by the main circuit conductors, the switch group circuit of the upper arm, which is the other phase of the single-phase inverter, has a first series body in which two switching elements of V11 and V12 are connected in series, a second series body in which two switching elements of V21 and V22 are connected in series and a third series body in which two switching elements of V31 and V32 are connected in series, and the switch group circuit is configured so that the three series bodies of the first to third series bodies are connected parallel by the main circuit conductors, and the switch group circuit of the lower arm, which is the other phase of the single-phase inverter, has a first series body in which two switching elements of Y11 and Y12 are connected in series, a second series body in which two switching elements of Y21 and Y22 are connected in series and a third series body in which two switching elements of Y31 and Y32 are connected in series, and the switch group circuit is configured so that the three series bodies of the first to third series bodies are connected parallel by the main circuit conductors; and a controller that performs switching control of each switching element of the switch group circuits of the single-phase inverter by time division of 1/(M×N), the time division operation method comprises: step of generating, by the controller, a clock with ON and OFF of an output voltage command of the single-phase inverter being a trigger, a switching element U11 and Y11 gate command signal with (2×2(=the number M of series connection)×3 (the number N of parallel connection)) clocks being one cycle and with an ON signal being outputted for a period of (2×3(=the number N of parallel connection)×1 (=the number M of series connection−1)+1) clocks and an OFF signal being outputted for a period of [(2×2(=the number M of series connection)×3(=the number N of parallel connection))−(2×3 (=the number N of parallel connection)×1(=the number M of series connection−1)+1)] clocks, a switching element X11 and V11 gate command signal that is delayed by 1 clock with respect to the switching element U11 and Y11 gate command signal and has the same ON and OFF periods as ON and OFF periods of the switching element U11 and Y11 gate command signal, a switching element U21 and Y21 gate command signal that is delayed by 1 clock with respect to the switching element X11 and V11 gate command signal and has the same ON and OFF periods as ON and OFF periods of the switching element X11 and V11 gate command signal, a switching element X21 and V21 gate command signal that is delayed by 1 clock with respect to the switching element U21 and Y21 gate command signal and has the same ON and OFF periods as ON and OFF periods of the switching element U21 and Y21 gate command signal, a switching element U31 and Y31 gate command signal that is delayed by 1 clock with respect to the switching element X21 and V21 gate command signal and has the same ON and OFF periods as ON and OFF periods of the switching element X21 and V21 gate command signal, a switching element X31 and V31 gate command signal that is delayed by 1 clock with respect to the switching element U31 and Y31 gate command signal and has the same ON and OFF periods as ON and OFF periods of the switching element U31 and Y31 gate command signal, a switching element U12 and Y12 gate command signal that is delayed by 1 clock with respect to the switching element X31 and V31 gate command signal and has the same ON and OFF periods as ON and OFF periods of the switching element X31 and V31 gate command signal, a switching element X12 and V12 gate command signal that is delayed by 1 clock with respect to the switching element U12 and Y12 gate command signal and has the same ON and OFF periods as ON and OFF periods of the switching element U12 and Y12 gate command signal, a switching element U22 and Y22 gate command signal that is delayed by 1 clock with respect to the switching element X12 and V12 gate command signal and has the same ON and OFF periods as ON and OFF periods of the switching element X12 and V12 gate command signal, a switching element X22 and V22 gate command signal that is delayed by 1 clock with respect to the switching element U22 and Y22 gate command signal and has the same ON and OFF periods as ON and OFF periods of the switching element U22 and Y22 gate command signal, a switching element U32 and Y32 gate command signal that is delayed by 1 clock with respect to the switching element X22 and V22 gate command signal and has the same ON and OFF periods as ON and OFF periods of the switching element X22 and V22 gate command signal, and a switching element X32 and V32 gate command signal that is delayed by 1 clock with respect to the switching element U32 and Y32 gate command signal and has the same ON and OFF periods as ON and OFF periods of the switching element U32 and Y32 gate command signal; and step of ON/OFF-controlling each of the switching elements by each of the generated gate command signals.

A resonant load power conversion device having a single-phase inverter whose DC input side is connected to a DC voltage source and whose output side is connected to a resonant load and which outputs a rectangular wave voltage at resonance frequency, described in claim 2, comprises: switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors; and a controller that performs switching control of each switching element of the switch group circuits of the single-phase inverter by time division of 1/(M×N), and wherein each of the N series bodies in each switch group circuit is formed by a module, and the M switching elements in each series body are connected inside the module.

A time division operation method of a resonant load power conversion device having a single-phase inverter whose DC input side is connected to a DC voltage source and whose output side is connected to a resonant load and which outputs a rectangular wave voltage at resonance frequency, described in claim 5, the resonant load power conversion device includes: switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein each of the N series bodies in each switch group circuit is formed by a module, and the M switching elements in each series body are connected inside the module, the time division operation method comprises: step of performing switching control of each switching element of the switch group circuits of the single-phase inverter by time division of 1/(M×N) by a controller.

A resonant load power conversion device having a single-phase inverter whose DC input side is connected to a DC voltage source and whose output side is connected to a resonant load and which outputs a rectangular wave voltage at resonance frequency, described in claim 3, comprises: switch group circuits that are connected to respective upper and lower arms of one phase of the single-phase inverter and the other phase of the single-phase inverter, each of the switch group circuits being configured so that n (n=an integer of 2 or more) series bodies each having m (m=an integer of 2 or more) switching elements are connected parallel by main circuit conductors, and wherein, the switch group circuit of the upper arm, which is the one phase of the single-phase inverter, has a first series body in which m switching elements of U11 to U1m are connected in series, . . . and an nth series body in which m switching elements of Un1 to Unm are connected in series, and the switch group circuit is configured so that the n series bodies of the first to nth series bodies are connected parallel by the main circuit conductors, the switch group circuit of the lower arm, which is the one phase of the single-phase inverter, has a first series body in which m switching elements of X11 to X1m are connected in series, . . . and an nth series body in which m switching elements of Xn1 to Xnm are connected in series, and the switch group circuit is configured so that the n series bodies of the first to nth series bodies are connected parallel by the main circuit conductors, the switch group circuit of the upper arm, which is the other phase of the single-phase inverter, has a first series body in which m switching elements of V11 to V1m are connected in series, . . . and an nth series body in which m switching elements of Vn1 to Vnm are connected in series, and the switch group circuit is configured so that the n series bodies of the first to nth series bodies are connected parallel by the main circuit conductors, and the switch group circuit of the lower arm, which is the other phase of the single-phase inverter, has a first series body in which m switching elements of Y11 to Y1m are connected in series, . . . and an nth series body in which m switching elements of Yn1 to Ynm are connected in series, and the switch group circuit is configured so that the n series bodies of the first to nth series bodies are connected parallel by the main circuit conductors; and a controller that performs switching control of each switching element of the switch group circuits of the single-phase inverter by time division of 1/(m×n), and has a gate command generator that generates a clock with ON and OFF of an output voltage command of the single-phase inverter being a trigger, a switching element U11 and Y11 gate command signal U11_gate/Y11_gate with (2×the number M of series connection×the number N of parallel connection (M, N=an integer of 2 or more)) clocks being one cycle and with an ON signal being outputted for a period of (2×the number N of parallel connection×(the number M of series connection−1)+1) clocks and an OFF signal being outputted for a period of [(2×the number M of series connection×the number N of parallel connection)−(2×the number N of parallel connection×(the number M of series connection−1)+1)] clocks, a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate, a switching element U21 and Y21 gate command signal U21_gate/Y21_gate that is delayed by 1 clock with respect to the gate command signal X11_gate/V11_gate and has the same ON and OFF periods as ON and OFF periods of the gate command signal X11_gate/V11_gate, a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate, . . . a switching element Un1 and Yn1 gate command signal Un1_gate/Yn1_gate that is delayed by 1 clock with respect to a gate command signal X(n−1)1_gate/V(n−1)1_gate and has the same ON and OFF periods as ON and OFF periods of the gate command signal X(n−1)1_gate/V(n−1)1_gate, a switching element Xn1 and Vn1 gate command signal Xn1_gate/Vn1_gate that is delayed by 1 clock with respect to the gate command signal Un1_gate/Yn1_gate and has the same ON and OFF periods as ON and OFF periods of the gate command signal Un1_gate/Yn1_gate, a switching element U12 and Y12 gate command signal U12_gate/Y12_gate that is delayed by 1 clock with respect to the gate command signal Xn1_gate/Vn1_gate and has the same ON and OFF periods as ON and OFF periods of the gate command signal Xn1_gate/Vn1_gate, a switching element X12 and V12 gate command signal X12_gate/V12_gate that is delayed by 1 clock with respect to the gate command signal U12_gate/Y12_gate and has the same ON and OFF periods as ON and OFF periods of the gate command signal U12_gate/Y12_gate, a switching element U22 and Y22 gate command signal U22_gate/Y22_gate that is delayed by 1 clock with respect to the gate command signal X12_gate/V12_gate and has the same ON and OFF periods as ON and OFF periods of the gate command signal X12_gate/V12_gate, a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate, . . . a switching element Un2 and Yn2 gate command signal Un2_gate/Yn2_gate that is delayed by 1 clock with respect to a gate command signal X(n−1)2_gate/V(n−1)2_gate and has the same ON and OFF periods as ON and OFF periods of the gate command signal X(n−1)2_gate/V(n−1)2_gate, a switching element Xn2 and Vn2 gate command signal Xn2_gate/Vn2_gate that is delayed by 1 clock with respect to the gate command signal Un2_gate/Yn2_gate and has the same ON and OFF periods as ON and OFF periods of the gate command signal Un2_gate/Yn2_gate, . . . a switching element Unm and Ynm gate command signal Unm_gate/Ynm_gate that is delayed by 1 clock with respect to a gate command signal X(n−1)m_gate/V(n−1)m_gate and has the same ON and OFF periods as ON and OFF periods of the gate command signal X(n−1) m_gate/V (n−1) m_gate, and a switching element Xnm and Vnm gate command signal Xnm_gate/Vnm_gate that is delayed by 1 clock with respect to the gate command signal Unm_gate/Ynm_gate and has the same ON and OFF periods as ON and OFF periods of the gate command signal Unm_gate/Ynm_gate, and wherein each of the switching elements is ON/OFF-controlled by each of the generated gate command signals.

A time division operation method of a resonant load power conversion device having a single-phase inverter whose DC input side is connected to a DC voltage source and whose output side is connected to a resonant load and which outputs a rectangular wave voltage at resonance frequency, described in claim 5, the resonant load power conversion device includes: switch group circuits that are connected to respective upper and lower arms of one phase of the single-phase inverter and the other phase of the single-phase inverter, each of the switch group circuits being configured so that n (n=an integer of 2 or more) series bodies each having m (m=an integer of 2 or more) switching elements are connected parallel by main circuit conductors, and wherein, the switch group circuit of the upper arm, which is the one phase of the single-phase inverter, has a first series body in which m switching elements of U11 to U1m are connected in series, . . . and an nth series body in which m switching elements of Un1 to Unm are connected in series, and the switch group circuit is configured so that the n series bodies of the first to nth series bodies are connected parallel by the main circuit conductors, the switch group circuit of the lower arm, which is the one phase of the single-phase inverter, has a first series body in which m switching elements of X11 to X1m are connected in series, . . . and an nth series body in which m switching elements of Xn1 to Xnm are connected in series, and the switch group circuit is configured so that the n series bodies of the first to nth series bodies are connected parallel by the main circuit conductors, the switch group circuit of the upper arm, which is the other phase of the single-phase inverter, has a first series body in which m switching elements of V11 to V1m are connected in series, . . . and an nth series body in which m switching elements of Vn1 to Vnm are connected in series, and the switch group circuit is configured so that the n series bodies of the first to nth series bodies are connected parallel by the main circuit conductors, and the switch group circuit of the lower arm, which is the other phase of the single-phase inverter, has a first series body in which m switching elements of Y11 to Y1m are connected in series, . . . and an nth series body in which m switching elements of Yn1 to Ynm are connected in series, and the switch group circuit is configured so that the n series bodies of the first to nth series bodies are connected parallel by the main circuit conductors, the time division operation method comprises: step of performing switching control of each switching element of the switch group circuits of the single-phase inverter by time division of 1/(m×n) by a controller; step of generating, by a gate command generator, a clock with ON and OFF of an output voltage command of the single-phase inverter being a trigger, a switching element U11 and Y11 gate command signal U11_gate/Y11_gate with (2×the number M of series connection×the number N of parallel connection (M, N=an integer of 2 or more)) clocks being one cycle and with an ON signal being outputted for a period of (2×the number N of parallel connection×(the number M of series connection−1)+1) clocks and an OFF signal being outputted for a period of [(2×the number M of series connection×the number N of parallel connection)−(2× the number N of parallel connection×(the number M of series connection−1)+1)] clocks, a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate, a switching element U21 and Y21 gate command signal U21 gate/Y21_gate that is delayed by 1 clock with respect to the gate command signal X11_gate/V11_gate and has the same ON and OFF periods as ON and OFF periods of the gate command signal X11_gate/V11_gate, a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate, . . . a switching element Un1 and Yn1 gate command signal Un1_gate/Yn1_gate that is delayed by 1 clock with respect to a gate command signal X(n−1)1_gate/V(n−1)1_gate and has the same ON and OFF periods as ON and OFF periods of the gate command signal X(n−1)1_gate/V(n−1)1_gate, a switching element Xn1 and Vn1 gate command signal Xn1_gate/Vn1_gate that is delayed by 1 clock with respect to the gate command signal Un1_gate/Yn1_gate and has the same ON and OFF periods as ON and OFF periods of the gate command signal Un1_gate/Yn1_gate, a switching element U12 and Y12 gate command signal U12_gate/Y12_gate that is delayed by 1 clock with respect to the gate command signal Xn1_gate/Vn1_gate and has the same ON and OFF periods as ON and OFF periods of the gate command signal Xn1_gate/Vn1_gate, a switching element X12 and V12 gate command signal X12_gate/V12_gate that is delayed by 1 clock with respect to the gate command signal U12_gate/Y12_gate and has the same ON and OFF periods as ON and OFF periods of the gate command signal U12_gate/Y12_gate, a switching element U22 and Y22 gate command signal U22_gate/Y22_gate that is delayed by 1 clock with respect to the gate command signal X12_gate/V12_gate and has the same ON and OFF periods as ON and OFF periods of the gate command signal X12_gate/V12_gate, a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate, . . . a switching element Un2 and Yn2 gate command signal Un2_gate/Yn2_gate that is delayed by 1 clock with respect to a gate command signal X(n−1)2_gate/V(n−1)2_gate and has the same ON and OFF periods as ON and OFF periods of the gate command signal X(n−1)2_gate/V(n−1)2_gate, a switching element Xn2 and Vn2 gate command signal Xn2_gate/Vn2_gate that is delayed by 1 clock with respect to the gate command signal Un2_gate/Yn2_gate and has the same ON and OFF periods as ON and OFF periods of the gate command signal Un2_gate/Yn2_gate, . . . a switching element Unm and Ynm gate command signal Unm_gate/Ynm_gate that is delayed by 1 clock with respect to a gate command signal X(n−1)m_gate/V(n−1)m_gate and has the same ON and OFF periods as ON and OFF periods of the gate command signal X(n−1)m_gate/V(n−1) m_gate, and a switching element Xnm and Vnm gate command signal Xnm_gate/Vnm_gate that is delayed by 1 clock with respect to the gate command signal Unm_gate/Ynm_gate and has the same ON and OFF periods as ON and OFF periods of the gate command signal Unm_gate/Ynm_gate; and step of ON/OFF-controlling each of the switching elements by each of the generated gate command signals.

(1) According to the invention described in claims 1 to 6, it is possible to decrease a switching frequency of each switching element to frequency that is inversely proportional to the product (M series×N parallel) of the number of series and parallel connection Further, the number of the main circuit conductors, which connect the DC link voltage input section Vdc and the DC input side terminal of each switching element of the upper and lower arms and connect the rectangular wave voltage output section Vout and the output side terminal of each switching element of the upper and lower arms, can be reduced with respect to the number of the switching elements (M×N) (the number of the main circuit conductors can be smaller than the number of the switching elements (M×N)). With this, cost of the device can be reduced. Also, an arrangement space of the main circuit conductor can be small.

Since connection of the switching elements of the switch group circuit is M series and N parallel connection, an arrangement of the switching element is not increased as compared with a conventional device, then variations in impedance due to variations in a route length of the main circuit conductor can be decreased.

(2) According to the invention described in claims 1, 3, 4 and 6, since a period for which the switching element is turned ON or turned OFF continues by a plurality of clocks and the gate command signals generated by the gate command generator, a limit of an output frequency, which depends on a limit of a minimum pulse width determined by element characteristics, can be avoided.

EMBODIMENTS FOR CARRYING OUT THE INVENTION

Embodiments of the present invention will be explained below with reference to the drawings. However, the present invention is not limited to the embodiments.

Embodiment 1

Figure 1:
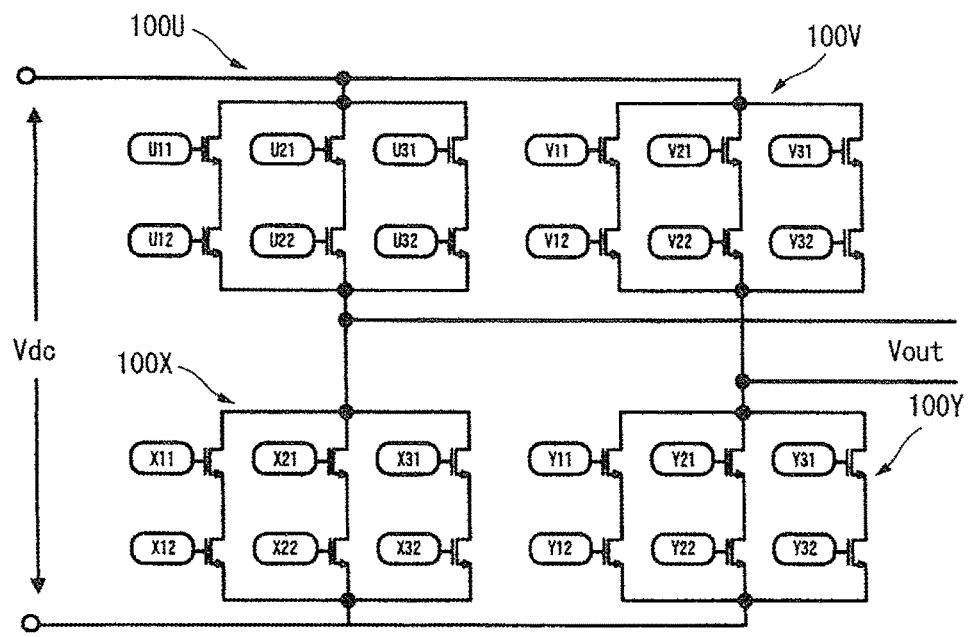
FIG. 1 is a circuit configuration of a single-phase inverter according to an embodiment 1 of the present invention.
Figure 7:
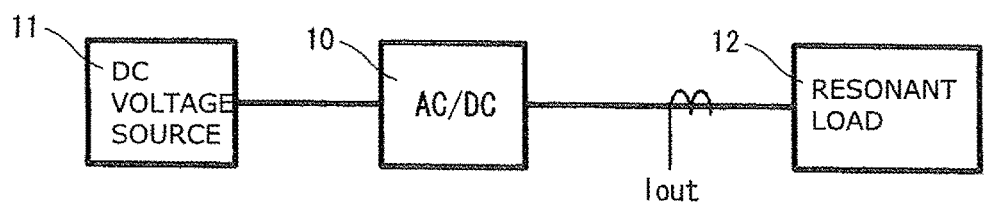
FIG. 7 is a block diagram of a resonant load power conversion device to which the present invention is applied.
Figure 8:
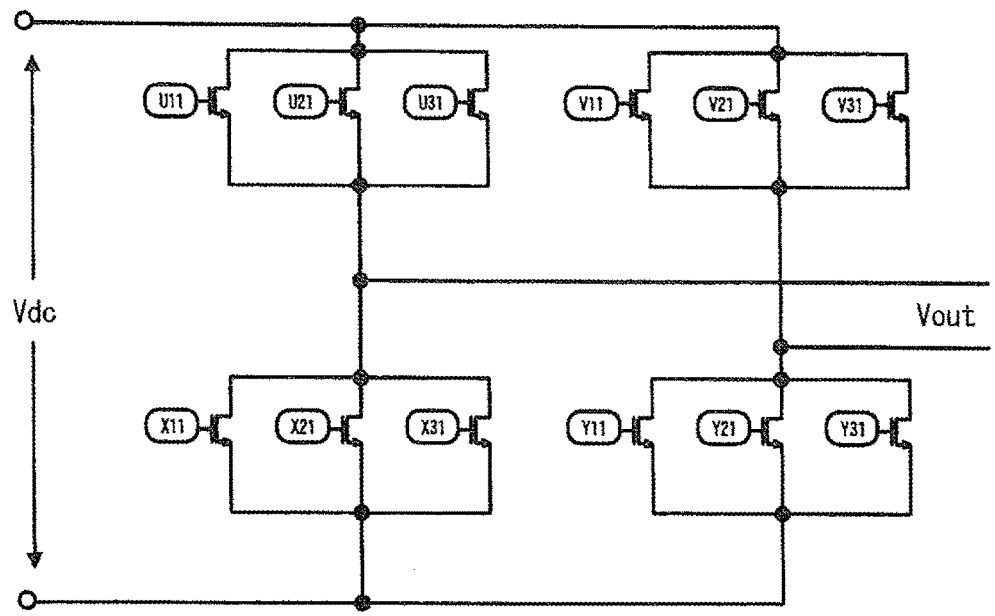
FIG. 8 is a circuit configuration of an inverter section that is a modified example of a resonant load inverter system of Patent Document 1.
Figure 9:
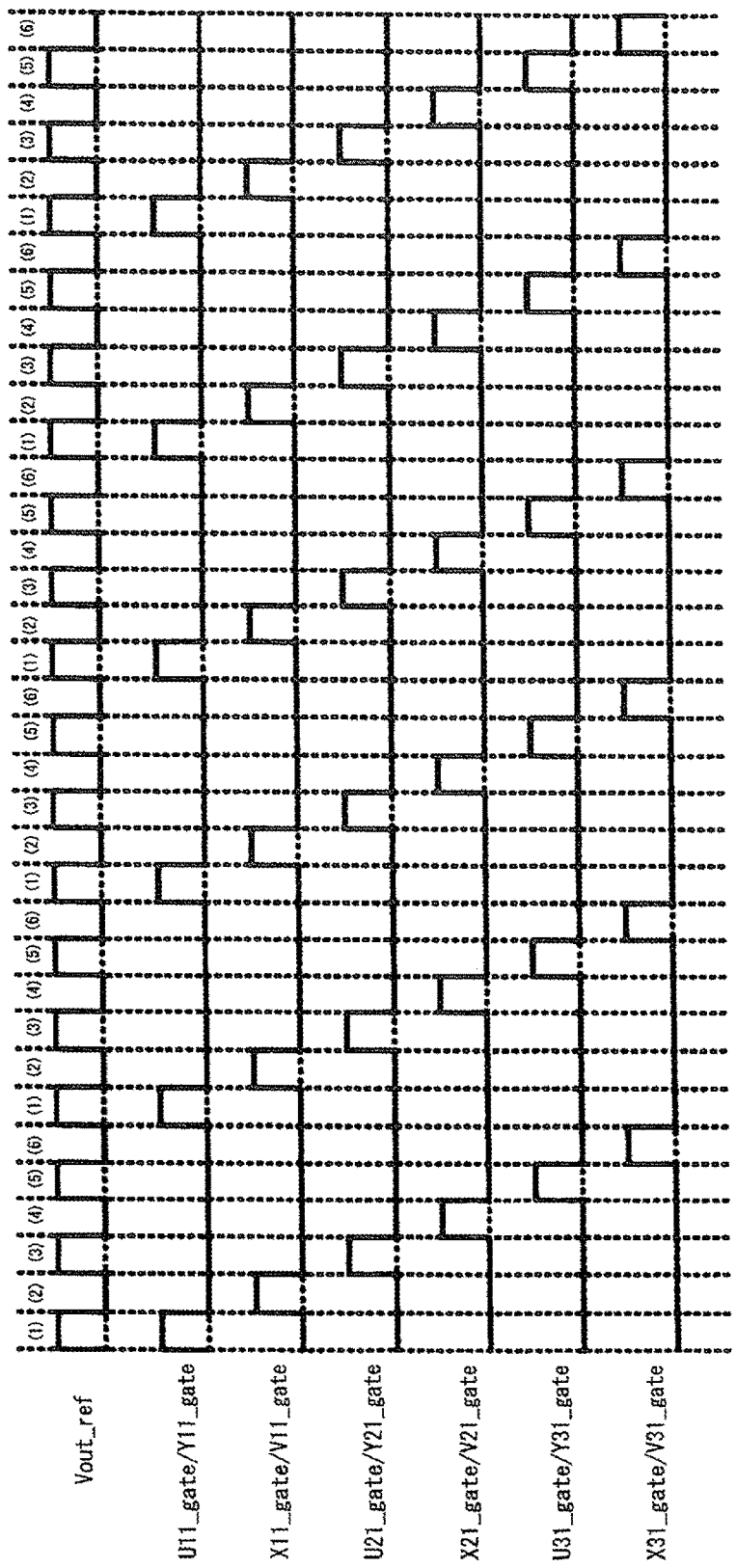
FIG. 9 is a signal wave diagram showing an example of a gate command signal generating pattern for controlling each switching element of the inverter section shown in FIG. 8.
Figure 10A:
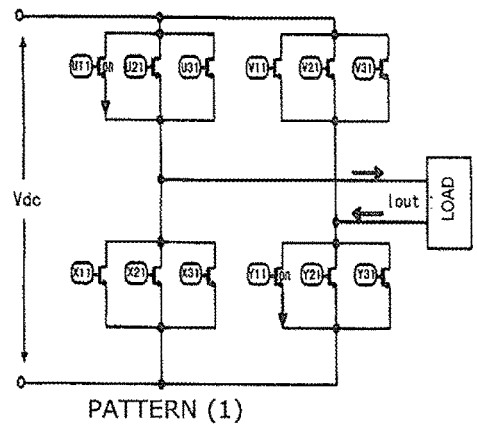
FIGS. 10A to 10F are diagrams that correspond to the gate command signal generating patterns (1) to (6) of FIG. 9, and explain a state of an ON-controlled switching element and an output current route.
Figure 10B:
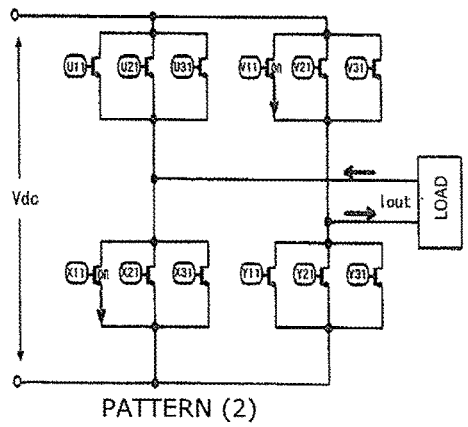
Figure 10C:
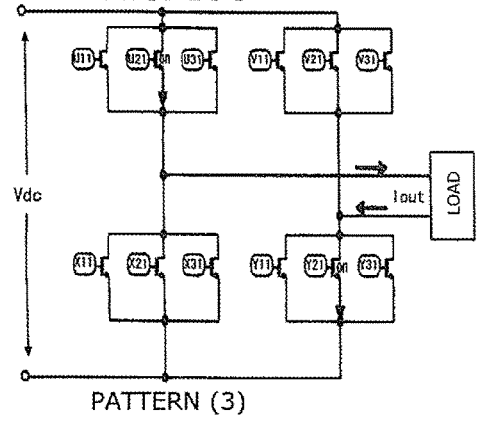
Figure 10D:
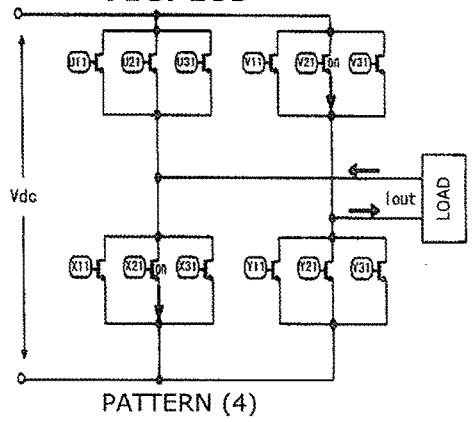
Figure 10E:
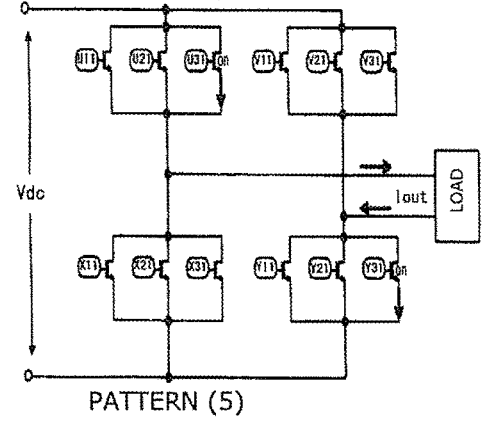
Figure 10F:
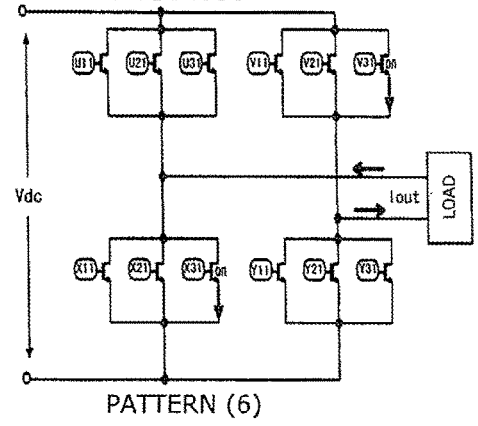

FIG. 1 is a circuit configuration of a single-phase inverter section according to an embodiment 1, and shows a single-phase inverter applied to, for instance, the AC-DC conversion device 10 (the resonant load power conversion device) of FIG. 7.

The single-phase inverter of FIG. 1 is configured so that a DC input section is connected to a DC link voltage input section Vdc, switch group circuits 100U, 100V, 100X and 100Y each having switching elements (e.g. IGBTs) of M series and N parallel (M=an integer of 2 or more, N=an integer of 2 or more; in an example of FIG. 1, M=2, N=3 (2 series and 3 parallel)) are connected to respective arms, and a rectangular wave output voltage Vout is outputted between a common connecting point of the switch group circuits 100U and 100X and a common connecting point of the switch group circuits 100V and 100Y.

The switch group circuit 100U of an upper arm, which is one phase of the single-phase inverter, has a first series body in which two switching elements of U11 and U12 are connected in series, a second series body in which two switching elements of U21 and U22 are connected in series and a third series body in which two switching elements of U31 and U32 are connected in series. The switch group circuit 100U is configured so that these three series bodies of the first to third series bodies are connected parallel between these three series bodies by main circuit conductors.

The switch group circuit 100X of a lower arm, which is one phase of the single-phase inverter, has a first series body in which two switching elements of X11 and X12 are connected in series, a second series body in which two switching elements of X21 and X22 are connected in series and a third series body in which two switching elements of X31 and X32 are connected in series. The switch group circuit 100X is configured so that these three series bodies of the first to third series bodies are connected parallel between these three series bodies by main circuit conductors.

The switch group circuit 100V of the upper arm, which is the other phase of the single-phase inverter, has a first series body in which two switching elements of V11 and V12 are connected in series, a second series body in which two switching elements of V21 and V22 are connected in series and a third series body in which two switching elements of V31 and V32 are connected in series. The switch group circuit 100V is configured so that these three series bodies of the first to third series bodies are connected parallel between these three series bodies by main circuit conductors.

The switch group circuit 100Y of the lower arm, which is the other phase of the single-phase inverter, has a first series body in which two switching elements of Y11 and Y12 are connected in series, a second series body in which two switching elements of Y21 and Y22 are connected in series and a third series body in which two switching elements of Y31 and Y32 are connected in series. The switch group circuit 100Y is configured so that these three series bodies of the first to third series bodies are connected parallel between these three series bodies by main circuit conductors.

Each series body is formed by a two-in-one structure module. And, the two switching elements in each series body are connected inside the module.

As described above, according to the single-phase inverter of FIG. 1, since the switching elements of the switch group circuit are connected in series and parallel (since connection of the switching elements of the switch group circuit is series and parallel connection), the number of the main circuit conductors, which connect the DC link voltage input section Vdc and the DC input side terminal of each switching element of the upper and lower arms and connect the rectangular wave voltage output section Vout and the output side terminal of each switching element of the upper and lower arms, can be reduced with respect to the number of the switching elements (M×N) (the number of the main circuit conductors can be smaller than the number of the switching elements (M×N)). And, since the connection of the switching elements of the switch group circuit is series and parallel connection, an arrangement space of the main circuit conductor is not increased in proportion to the number of the switching elements (M×N), then variations in impedance due to variations in a route length of the main circuit conductor can be decreased.

Figure 2:
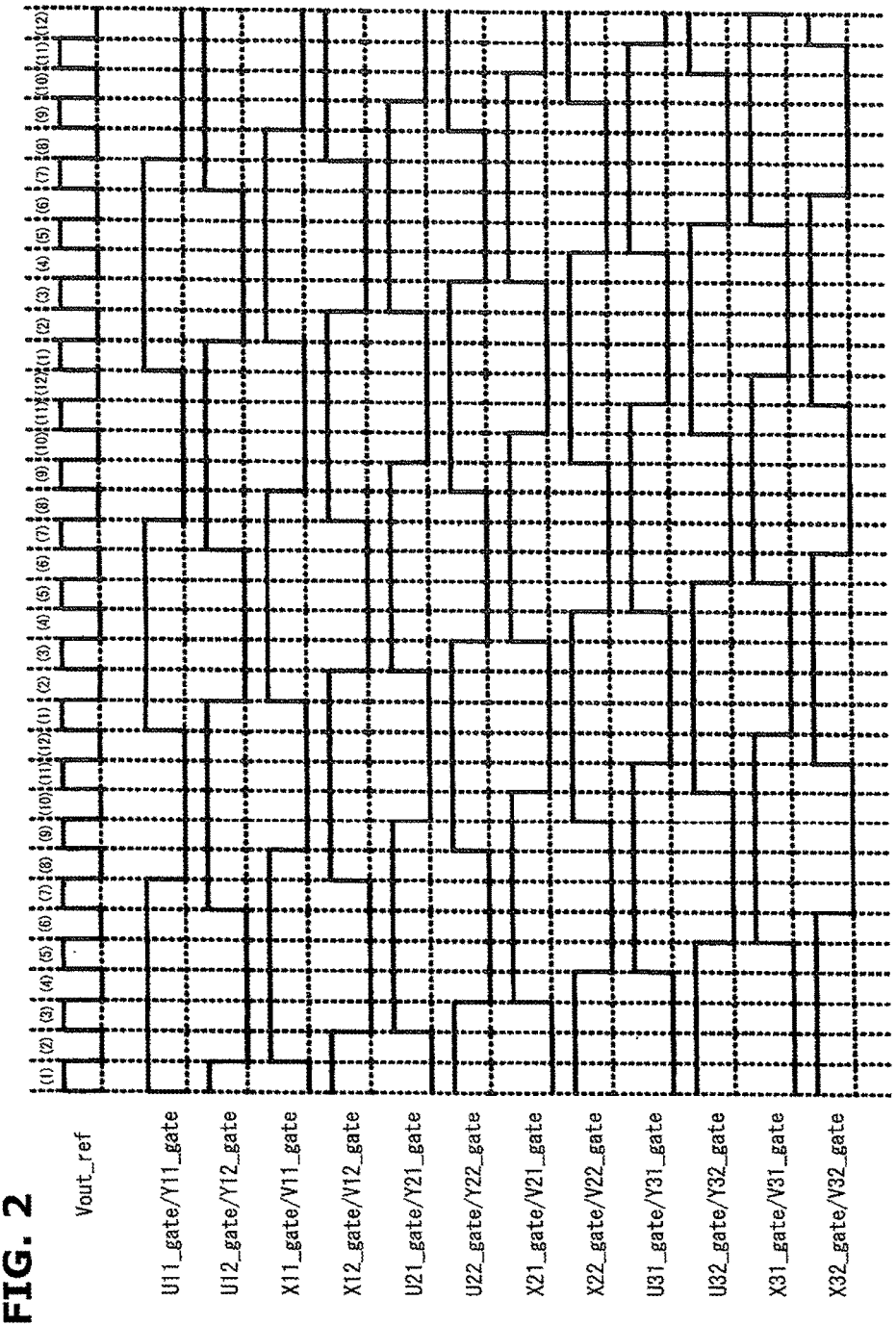
FIG. 2 is a signal wave diagram showing an example of a gate command signal generating pattern according to the embodiment 1 of the present invention.

A control section (a controller) controlling the single-phase inverter of FIG. 1 has a gate command generating section (a gate command generator) that generates clocks and gate command signals shown in a gate command signal generating pattern in FIG. 2. The control section ON/OFF-controls each switching element by the generated gate command signal.

The gate command signal generating pattern of FIG. 2 shows a signal generating pattern of a case where the number M of series connection is 2 and the number N of parallel connection is 3 in FIG. 1, using the clock with ON and OFF of an output voltage command (Vout_ref) of the single-phase inverter being a trigger, one period (one cycle) is 2*M*N=12 clocks, ON signal is 2*N*(M−1)+1=7 clocks and OFF signal is (2*M*N)−[2*N*(M−1)+1]=5 clocks.

Therefore, the gate command signal generating pattern of FIG. 2 is formed from a clock with ON and OFF of the output voltage command (Vout_ref) of the single-phase inverter being a trigger, a switching element U11 and Y11 gate command signal U11_gate/Y11_gate with 12 (2×(the number M of series connection)×(the number N of parallel connection)) clocks being one period (one cycle) and with the ON signal being outputted at 7 (2×(the number N of parallel connection)×(the number M of series connection−1)+1) clocks and the OFF signal being outputted at 5 [(2×(the number M of series connection)×(the number N of parallel connection))−(2×(the number N of parallel connection)×(the number M of series connection−1)+1)] clocks, a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate, a switching element U21 and Y21 gate command signal U21_gate/Y21 gate that is delayed by 1 clock with respect to the gate command signal X11_gate/V11_gate and has the same ON and OFF periods as ON and OFF periods of the gate command signal X11_gate/V11_gate, a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate, a switching element U31 and Y31 gate command signal U31_gate/Y31_gate that is delayed by 1 clock with respect to the gate command signal X21_gate/V21_gate and has the same ON and OFF periods as ON and OFF periods of the gate command signal X21_gate/V21_gate, a switching element X31 and V31 gate command signal X31_gate/V31_gate that is delayed by 1 clock with respect to the gate command signal U31_gate/Y31_gate and has the same ON and OFF periods as ON and OFF periods of the gate command signal U31_gate/Y31_gate, a switching element U12 and Y12 gate command signal U12_gate/Y12_gate that is delayed by 1 clock with respect to the gate command signal X31_gate/V31_gate and has the same ON and OFF periods as ON and OFF periods of the gate command signal X31_gate/V31_gate, a switching element X12 and V12 gate command signal X12_gate/V12_gate that is delayed by 1 clock with respect to the gate command signal U12_gate/Y12_gate and has the same ON and OFF periods as ON and OFF periods of the gate command signal U12_gate/Y12_gate, a switching element U22 and Y22 gate command signal U22_gate/Y22_gate that is delayed by 1 clock with respect to the gate command signal X12_gate/V12_gate and has the same ON and OFF periods as ON and OFF periods of the gate command signal X12_gate/V12_gate, a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate, a switching element U32 and Y32 gate command signal U32_gate/Y32_gate that is delayed by 1 clock with respect to the gate command signal X22_gate/V22_gate and has the same ON and OFF periods as ON and OFF periods of the gate command signal X22_gate/V22_gate, and a switching element X32 and V32 gate command signal X32_gate/V32_gate that is delayed by 1 clock with respect to the gate command signal U32_gate/Y32_gate and has the same ON and OFF periods as ON and OFF periods of the gate command signal U32_gate/Y32_gate.

Each switching element in FIG. 1 is ON/OFF-controlled by each generated gate command signal of U11_gate/Y11_gate . . . X32_gate/V32_gate shown in FIG. 2 with the patterns (1) to (12) shown in the drawings being repeated.

A relationship of an output current when ON/OFF-controlling each switching element of the switch group circuits in FIG. 1 by the gate command signal generating pattern shown in FIG. 2 is illustrated in FIGS. 3A to 3F and 4A to 4F.

FIGS. 3A to 3F correspond to the patterns (1) to (6) of FIG. 2, and FIGS. 4A to 4F correspond to the patterns (7) to (12) of FIG. 2. In FIGS. 3A to 3F and 4A to 4F, the switching element that is ON-controlled by the ON signal of the gate command is indicated by "ON", and a route of an output current Iout passing through the ON-controlled switching element and a load is shown by an arrow.

Each load in FIGS. 3A to 3F and 4A to 4F indicates a resonant load such as an induction heating device.

Figure 3A:
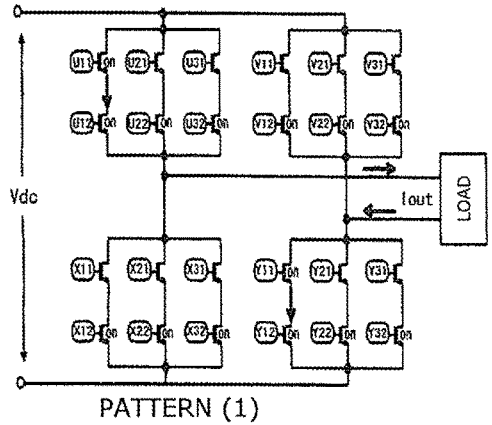
FIGS. 3A to 3F are diagrams that correspond to the gate command signal generating patterns (1) to (6) of FIG. 2, and explain a state of an ON-controlled switching element and an output current route.

In the pattern (1) of FIG. 3A, the switching elements U11, Y11, U12, Y12, X12, V12, U22, Y22, X22, V22, U32, Y32, X32 and V32 are ON-controlled. And, the switching elements 11, V11, U21, Y21, X21, V21, U31, Y31, X31 and V31 are OFF-controlled. With this, the current passes through a route of the switching elements U11→U12→the load→the switching elements Y11→Y12.

Figure 3B:
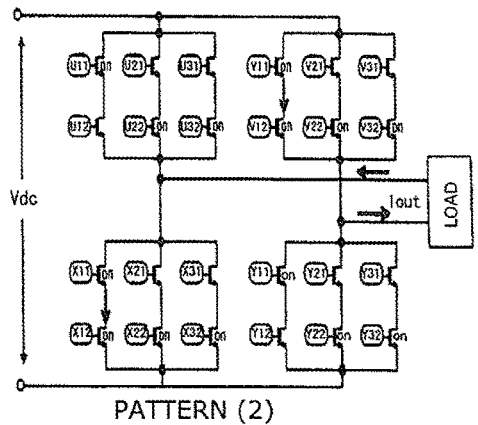

In the pattern (2) of FIG. 3B, the switching elements U11, Y11, 11, V11, X12, V12, U22, Y22, X22, V22, U32, Y32, X32 and V32 are ON-controlled. And, the switching elements U12, Y12, U21, Y21, X21, V21, U31, Y31, X31 and V31 are OFF-controlled. With this, the current passes through a route of the switching elements V11→V12→the load→the switching elements 11→X12.

Figure 3C:
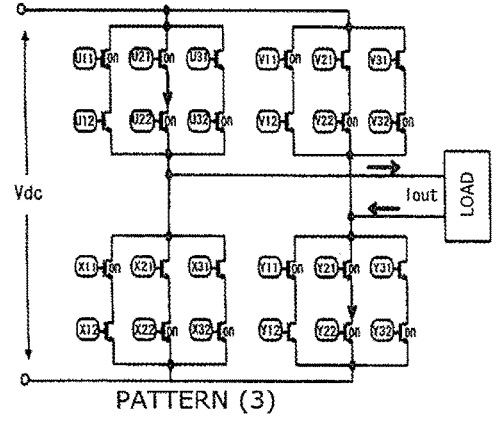

In the pattern (3) of FIG. 3C, the switching elements U11, Y11, 11, V11, U21, Y21, U22, Y22, X22, V22, U32, Y32, X32 and V32 are ON-controlled. And, the switching elements U12, Y12, X12, V12, X21, V21, U31, Y31, X31 and V31 are OFF-controlled. With this, the current passes through a route of the switching elements U21→U22→the load→the switching elements Y21→Y22.

Figure 3D:
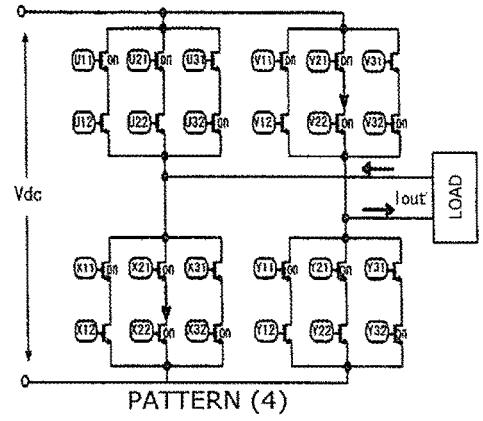

In the pattern (4) of FIG. 3D, the switching elements U11, Y11, 11, V11, U21, Y21, X21, V21, X22, V22, U32, Y32, X32 and V32 are ON-controlled. And, the switching elements U12, Y12, X12, V12, U22, Y22, U31, Y31, X31 and V31 are OFF-controlled. With this, the current passes through a route of the switching elements V21→V22→the load→the switching elements X21→X22.

Figure 3E:
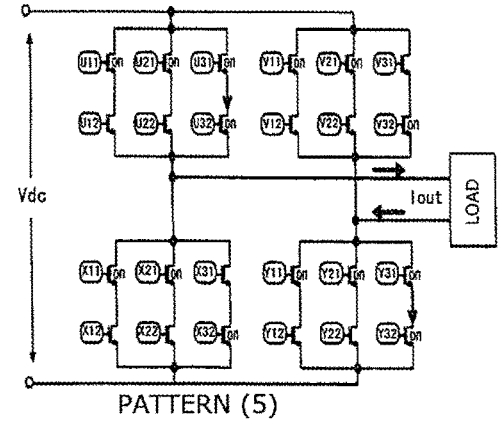

In the pattern (5) of FIG. 3E, the switching elements U11, Y11, 11, V11, U21, Y21, X21, V21, U31, Y31, U32, Y32, X32 and V32 are ON-controlled. And, the switching elements U12, Y12, X12, V12, U22, Y22, X22, V22, X31 and V31 are OFF-controlled. With this, the current passes through a route of the switching elements U31→U32→the load→the switching elements Y31→Y32.

Figure 3F:
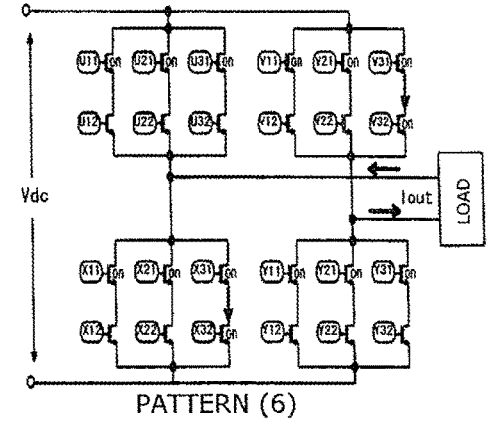

In the pattern (6) of FIG. 3F, the switching elements U11, Y11, 11, V11, U21, Y21, X21, V21, U31, Y31, X31, V31, X32 and V32 are ON-controlled. And, the switching elements U12, Y12, X12, V12, U22, Y22, X22, V22, U32 and Y32 are OFF-controlled. With this, the current passes through a route of the switching elements V31→V32→the load→the switching elements X31→X32.

Figure 4A:
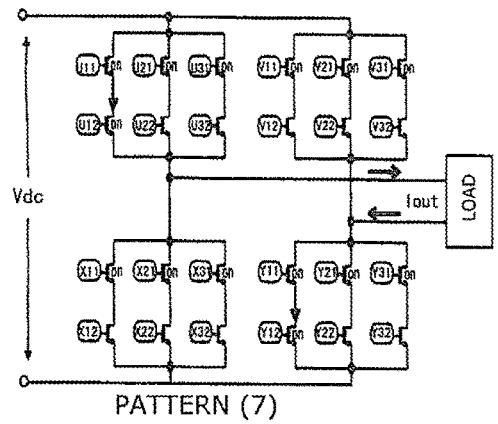
FIGS. 4A to 4F are diagrams that correspond to the gate command signal generating patterns (7) to (12) of FIG. 2, and explain a state of an ON-controlled switching element and an output current route.

In the pattern (7) of FIG. 4A, the switching elements U11, Y11, U12, Y12, 11, V11, U21, Y21, X21, V21, U31, Y31, X31 and V31 are ON-controlled. And, the switching elements X12, V12, U22, Y22, X22, V22, U32, Y32, X32 and V32 are OFF-controlled. With this, the current passes through a route of the switching elements U11→U12→the load→the switching elements Y11→Y12.

Figure 4B:
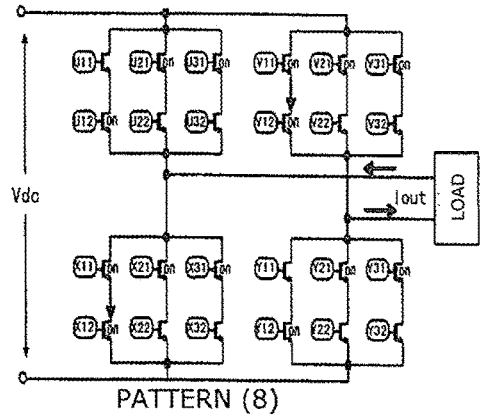

In the pattern (8) of FIG. 4B, the switching elements U12, Y12, 11, V11, X12, V12, U21, Y21, X21, V21, U31, Y31, X31 and V31 are ON-controlled. And, the switching elements U11, Y11, U22, Y22, X22, V22, U32 Y32, X32 and V32 are OFF-controlled. With this, the current passes through a route of the switching elements V11→V12→the load→the switching elements 11→X12.

Figure 4C:
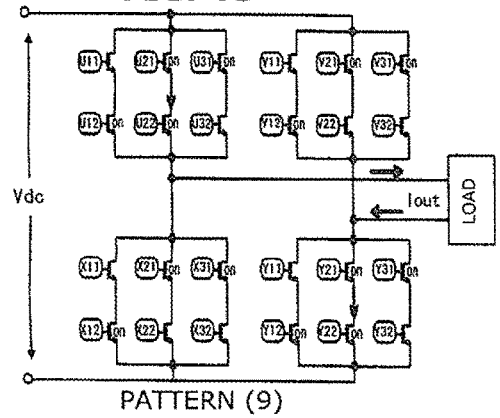

In the pattern (9) of FIG. 4C, the switching elements U12, Y12, X12, V12, U21, Y21, U22, Y22, X21, V21, U31, Y31, X31 and V31 are ON-controlled. And, the switching elements U11, Y11, 11, V11, X22, V22, U32, Y32, X32 and V32 are OFF-controlled. With this, the current passes through a route of the switching elements U21→U22→the load→the switching elements Y21→Y22.

Figure 4D:
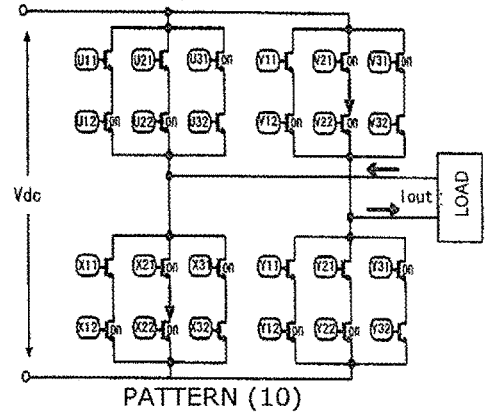

In the pattern (10) of FIG. 4D, the switching elements U12, Y12, X12, V12, U22, Y22, X21, V21, X22, V22, U31, Y31, X31 and V31 are ON-controlled. And, the switching elements U11, Y11, 11, V11, U21, Y21, U32, Y32, X32 and V32 are OFF-controlled. With this, the current passes through a route of the switching elements V21→V22→the load→the switching elements X21→X22.

Figure 4E:
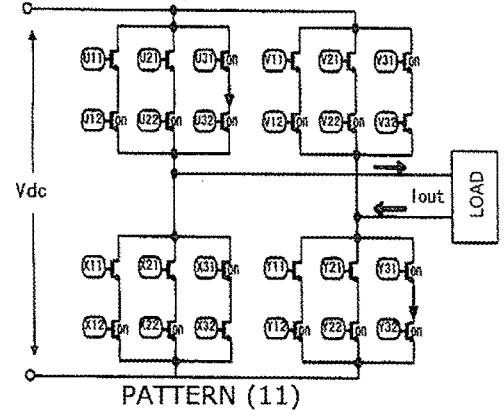

In the pattern (11) of FIG. 4E, the switching elements U12, Y12, X12, V12, U22, Y22, X22, V22, U31, Y31, U32, Y32, X31 and V31 are ON-controlled. And, the switching elements U11, Y11, 11, V11, U21, Y21, X21, V21, X32 and V32 are OFF-controlled. With this, the current passes through a route of the switching elements U31→U32→the load→the switching elements Y31→Y32.

Figure 4F:
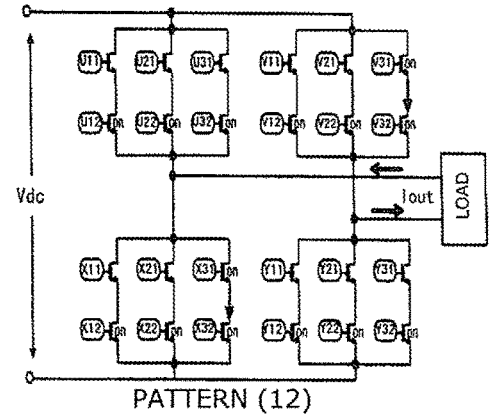

In the pattern (12) of FIG. 4F, the switching elements U12, Y12, X12, V12, U22, Y22, X22, V22, U32, Y32, X31, V31, X32 and V32 are ON-controlled. And, the switching elements U11, Y11, 11, V11, U21, Y21, X21, V21, U31 and Y31 are OFF-controlled. With this, the current passes through a route of the switching elements V31→V32→the load→the switching elements X31→X32.

By switching (ON/OFF controlling) each switching element sequentially (i.e. by performing a time division operation of each switching element) by the patterns (1) to (12) shown in FIGS. 3A to 3F and 4A to 4F, it is possible to decrease a drive frequency of one switching element to 1/(M×N) that is inversely proportional to the product (M×N) of the number of series and parallel connection, i.e. ⅙. Further, since a period for which the switching element is turned ON or turned OFF continues by a plurality of clocks, a limit of an output frequency, which depends on a limit of a minimum pulse width determined by element characteristics, can be avoided (an output frequency of the AC-DC conversion device is not limited by the element characteristics of the switching element).

Furthermore, since the switching elements of the switch group circuit are connected in series and parallel (since connection of the switching elements of the switch group circuit is series and parallel connection), the number of the main circuit conductors, which connect the DC link voltage input section Vdc and the DC input side terminal of each switching element of the upper and lower arms and connect the rectangular wave voltage output section Vout and the output side terminal of each switching element of the upper and lower arms, can be reduced with respect to the number of the switching elements (M×N) (the number of the main circuit conductors can be smaller than the number of the switching elements (M×N)). And, since the connection of the switching elements of the switch group circuit is series and parallel connection, an arrangement space of the main circuit conductor is not increased in proportion to the number of the switching elements (M×N), then variations in impedance due to variations in a route length of the main circuit conductor can be decreased.

Here, the number M of series connection of the switching elements in the switch group circuit for each arm in the single-phase inverter is not limited to 2, but it could be 3 or more. Also, the number N of parallel connection is not limited to 3, but it could be 2 or 4 or more. It is possible to further decrease the drive frequency (the switching frequency) of the switching element of the single-phase inverter in inverse proportion to the product (M×N) of the number of series and parallel connection.

Embodiment 2

Figure 5:
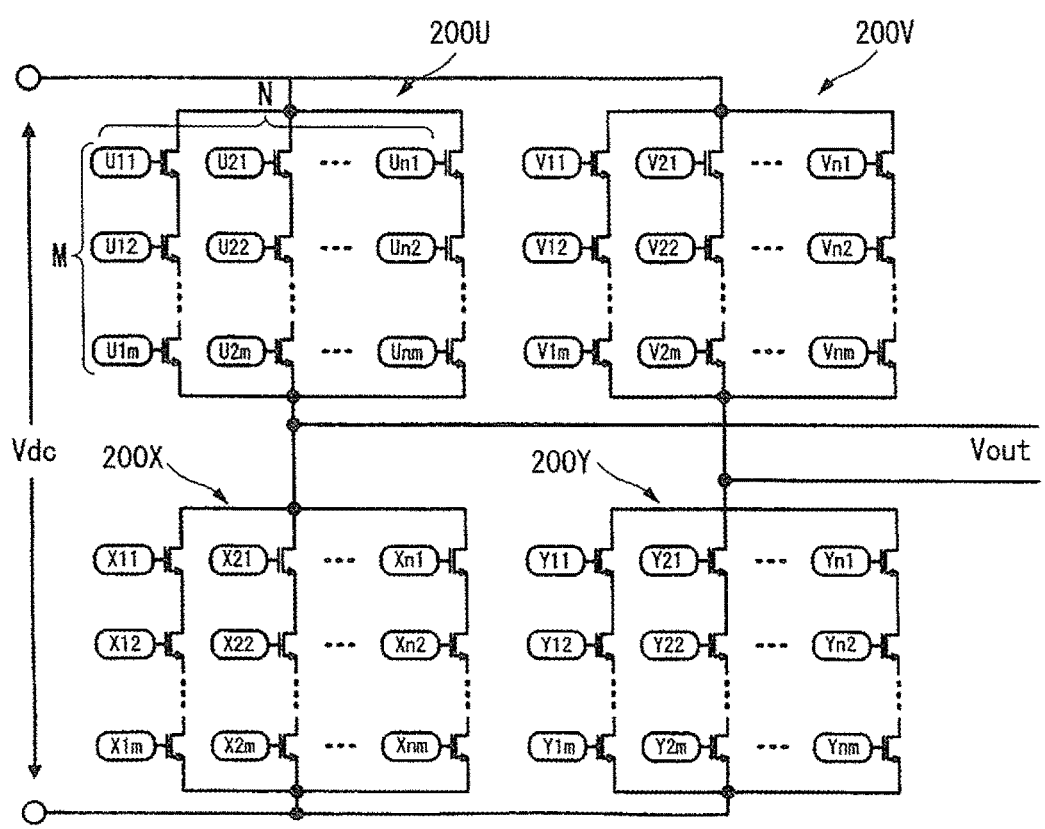
FIG. 5 is a circuit configuration of the single-phase inverter according to an embodiment 2 of the present invention.

FIG. 5 is a circuit configuration of a single-phase inverter section according to an embodiment 2, and shows a single-phase inverter applied to, for instance, the AC-DC conversion device 10 (the resonant load power conversion device) of FIG. 7.

The single-phase inverter of FIG. 5 is configured so that a DC input section is connected to a DC link voltage input section Vdc, switch group circuits 200U, 200V, 200X and 200Y each having switching elements (e.g. IGBTs) of M series and N parallel (M=an integer of 2 or more, N=an integer of 2 or more; in an example of FIG. 5, M is 3 or more, N is 3 or more) are connected to respective arms, and a rectangular wave output voltage Vout is outputted between a common connecting point of the switch group circuits 200U and 200X and a common connecting point of the switch group circuits 200V and 200Y.

The switch group circuit 200U of an upper arm, which is one phase of the single-phase inverter, has a first series body in which m switching elements of U11, U12 . . . U1m are connected in series, a second series body in which m switching elements of U21, U22 . . . U2m are connected in series and an nth series body in which m switching elements of Un1, Un2 . . . Unm are connected in series. The switch group circuit 200U is configured so that these n series bodies of the first to nth series bodies are connected parallel between these n series bodies by main circuit conductors.

The switch group circuit 200X of a lower arm, which is one phase of the single-phase inverter, has a first series body in which m switching elements of 11, X12 . . . X1m are connected in series, a second series body in which m switching elements of X21, X22 . . . X2m are connected in series and an nth series body in which m switching elements of Xn1, Xn2 . . . Xnm are connected in series. The switch group circuit 200X is configured so that these n series bodies of the first to nth series bodies are connected parallel between these n series bodies by main circuit conductors.

The switch group circuit 200V of the upper arm, which is the other phase of the single-phase inverter, has a first series body in which m switching elements of V11, V12 . . . V1m are connected in series, a second series body in which m switching elements of V21, V22 . . . V2m are connected in series and an nth series body in which m switching elements of Vn1, Vn2 . . . Vnm are connected in series. The switch group circuit 200V is configured so that these n series bodies of the first to nth series bodies are connected parallel between these n series bodies by main circuit conductors.

The switch group circuit 200Y of the lower arm, which is the other phase of the single-phase inverter, has a first series body in which m switching elements of Y11, Y12 . . . Y1m are connected in series, a second series body in which m switching elements of Y21, Y22 . . . Y2m are connected in series and an nth series body in which m switching elements of Yn1, Yn2 . . . Ynm are connected in series. The switch group circuit 200Y is configured so that these n series bodies of the first to nth series bodies are connected parallel between these n series bodies by main circuit conductors.

Each series body having the m switching elements is formed by one module. And, the m switching elements in each series body are connected inside the module.

As described above, according to the single-phase inverter of FIG. 5, since the switching elements of the switch group circuit are connected in series and parallel (since connection of the switching elements of the switch group circuit is series and parallel connection), the number of the main circuit conductors, which connect the DC link voltage input section Vdc and the DC input side terminal of each switching element of the upper and lower arms and connect the rectangular wave voltage output section Vout and the output side terminal of each switching element of the upper and lower arms, can be reduced with respect to the number of the switching elements (M×N) (the number of the main circuit conductors can be smaller than the number of the switching elements (M×N)). And, since the connection of the switching elements of the switch group circuit is series and parallel connection, an arrangement space of the main circuit conductor is not increased in proportion to the number of the switching elements (M×N), then variations in impedance due to variations in a route length of the main circuit conductor can be decreased.

Figure 6:
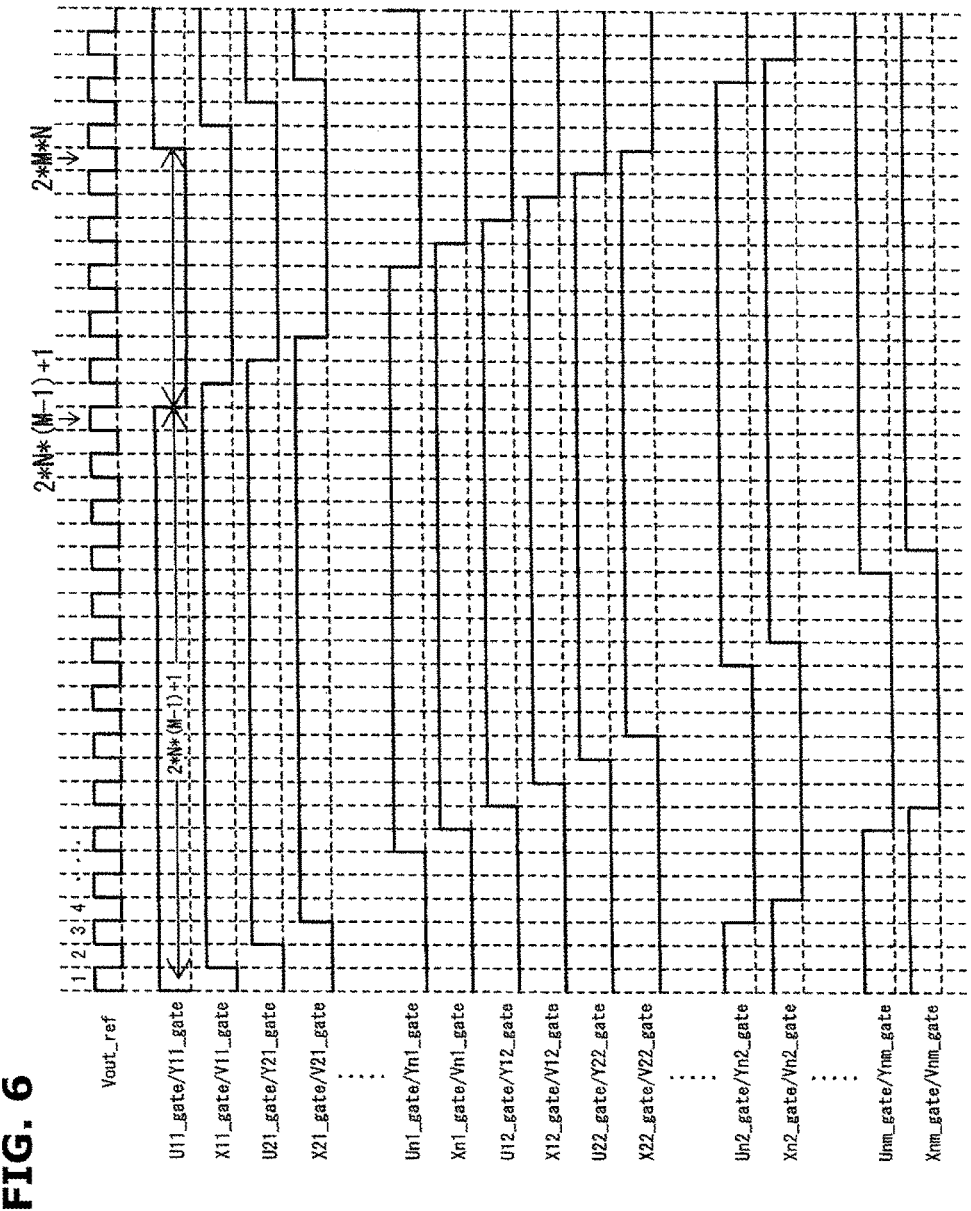
FIG. 6 is a signal wave diagram showing an example of the gate command signal generating pattern according to the embodiment 2 of the present invention.

A control section (a controller) controlling the single-phase inverter of FIG. 5 has a gate command generating section that generates clocks and gate command signals, for example, shown in a gate command signal generating pattern in FIG. 6. The control section ON/OFF-controls each switching element by the generated gate command signal.

The gate command signal generating pattern of FIG. 6 shows a signal generating pattern of a case where, assuming that the number M of series connection of the switching elements in the switch group circuit for each arm in the single-phase inverter is 3 and the number N of parallel connection is 6, one period (one cycle) is 2*M*N=36 clocks, ON signal is 2*N*(M−1)+1=25 clocks and OFF signal is (2*M*N)−[2*N*(M−1)+1]=11 clocks.

Here, in FIG. 6,
- a switching element U31 and Y31 gate command signal U31_gate/Y31_gate . . . a switching element X(n−1)1 and V(n−1)1 gate command signal X(n−1)1_gate/V(n−1)1_gate,
- a switching element U32 and Y32 gate command signal U32_gate/Y32_gate . . . a switching element X(n−1)2 and V(n−1)2 gate command signal X(n−1)2_gate/V(n−1)2_gate, and
- a switching element U1m and Y1m gate command signal U1m_gate/Y1m_gate . . . a switching element X(n−1)m and V(n−1)m gate command signal X(n−1)m_gate/V(n−1)m_gate are omitted.

Therefore, the gate command signal generating pattern of FIG. 6 is formed from
- a clock with ON and OFF of the output voltage command (Vout_ref) of the single-phase inverter being a trigger,
- a switching element U11 41and Y11 gate command signal U11_gate/Y11_gate with 36 (2×(the number M of series connection)×(the number N of parallel connection)) clocks being one period (one cycle) and with the ON signal being outputted at 25 (2×(the number N of parallel connection)×(the number M of series connection−1)+1) clocks and the OFF signal being outputted at 11 [(2×(the number M of series connection)×(the number N of parallel connection))−(2×(the number N of parallel connection)×(the number M of series connection−1)+1)] clocks,
- a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate,
- a switching element U21 and Y21 gate command signal U21_gate/Y21_gate that is delayed by 1 clock with respect to the gate command signal X11_gate/V11_gate and has the same ON and OFF periods as ON and OFF periods of the gate command signal X11_gate/V11_gate,
- a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate,

.

.

.

- a switching element Un1 and Yn1 gate command signal Un1_gate/Yn1_gate that is delayed by 1 clock with respect to a gate command signal X(n−1)1_gate/V(n−1)1_gate and has the same ON and OFF periods as ON and OFF periods of the gate command signal X(n−1)1_gate/V(n−1)1_gate,
- a switching element Xn1 and Vn1 gate command signal Xn1_gate/Vn1_gate that is delayed by 1 clock with respect to the gate command signal Un1_gate/Yn1_gate and has the same ON and OFF periods as ON and OFF periods of the gate command signal Un1_gate/Yn1_gate,
- a switching element U12 and Y12 gate command signal U12_gate/Y12_gate that is delayed by 1 clock with respect to the gate command signal Xn1_gate/Vn1_gate and has the same ON and OFF periods as ON and OFF periods of the gate command signal Xn1_gate/Vn1_gate,
- a switching element X12 and V12 gate command signal X12_gate/V12_gate that is delayed by 1 clock with respect to the gate command signal U12_gate/Y12_gate and has the same ON and OFF periods as ON and OFF periods of the gate command signal U12_gate/Y12_gate,
- a switching element U22 and Y22 gate command signal U22_gate/Y22_gate that is delayed by 1 clock with respect to the gate command signal X12 gate/V12_gate and has the same ON and OFF periods as ON and OFF periods of the gate command signal X12_gate/V12_gate,
- a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate,

.

.

.

- a switching element Un2 and Yn2 gate command signal Un2_gate/Yn2_gate that is delayed by 1 clock with respect to a gate command signal X(n−1)2_gate/V(n−1)2_gate and has the same ON and OFF periods as ON and OFF periods of the gate command signal X(n−1)2_gate/V(n−1)2_gate,
- a switching element Xn2 and Vn2 gate command signal Xn2_gate/Vn2_gate that is delayed by 1 clock with respect to the gate command signal Un2_gate/

Yn2_gate and has the same ON and OFF periods as ON and OFF periods of the gate command signal Un2_gate/Yn2_gate,

.
.
.

a switching element Unm and Ynm gate command signal Unm_gate/Ynm_gate that is delayed by 1 clock with respect to a gate command signal X(n−1)m_gate/V(n−1)m_gate and has the same ON and OFF periods as ON and OFF periods of the gate command signal X(n−1)m_gate/V(n−1)m_gate, and a switching element Xnm and Vnm gate command signal Xnm_gate/Vnm gate that is delayed by 1 clock with respect to the gate command signal Unm_gate/Ynm_gate and has the same ON and OFF periods as ON and OFF periods of the gate command signal Unm_gate/Ynm_gate.

Each switching element in the case where the number M of series connection of the switching elements in the switch group circuit for each arm in the single-phase inverter is 3 and the number N of parallel connection is 6 is ON/OFF-controlled by each generated gate command signal of U11_gate/Y11_gate . . . Xnm_gate/Vnm_gate shown in FIG. 6 with the patterns in one period (one cycle) (2×M×N clocks) being repeated.

By switching (ON/OFF controlling) each switching element sequentially (i.e. by performing a time division operation of each switching element) by the patterns shown in FIG. 6, it is possible to decrease a drive frequency of one switching element to 1/(M×N) that is inversely proportional to the product (M×N) of the number of series and parallel connection, i.e. 1/18.

Further, since a period for which the switching element is turned ON or turned OFF continues by a plurality of clocks, a limit of an output frequency, which depends on a limit of a minimum pulse width determined by element characteristics, can be avoided (an output frequency of the AC-DC conversion device is not limited by the element characteristics of the switching element).

Furthermore, since the switching elements of the switch group circuit are connected in series and parallel (since connection of the switching elements of the switch group circuit is series and parallel connection), the number of the main circuit conductors, which connect the DC link voltage input section Vdc and the DC input side terminal of each switching element of the upper and lower arms and connect the rectangular wave voltage output section Vout and the output side terminal of each switching element of the upper and lower arms, can be reduced with respect to the number of the switching elements (M×N) (the number of the main circuit conductors can be smaller than the number of the switching elements (M×N)). And, since the connection of the switching elements of the switch group circuit is series and parallel connection, an arrangement space of the main circuit conductor is not increased in proportion to the number of the switching elements (M×N), then variations in impedance due to variations in a route length of the main circuit conductor can be decreased.

The invention claimed is:

1. A resonant load power conversion device having a single-phase inverter whose DC input side is connected to a DC voltage source and whose output side is connected to a resonant load and which outputs a rectangular wave voltage at resonance frequency, comprising:

switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein, the switch group circuit of the upper arm, which is the one phase of the single-phase inverter, has a first series body in which two switching elements of U11 and U12 are connected in series, a second series body in which two switching elements of U21 and U22 are connected in series and a third series body in which two switching elements of U31 and U32 are connected in series, and the switch group circuit of the upper arm is configured so that the three series bodies of the first to third series bodies are connected parallel by the main circuit conductors, the switch group circuit of the lower arm, which is the one phase of the single-phase inverter, has a first series body in which two switching elements of X11 and X12 are connected in series, a second series body in which two switching elements of X21 and X22 are connected in series and a third series body in which two switching elements of X31 and X32 are connected in series, and the switch group circuit of the lower arm is configured so that the three series bodies of the first to third series bodies are connected parallel by the main circuit conductors, the switch group circuit of the upper arm, which is the other phase of the single-phase inverter, has a first series body in which two switching elements of V11 and V12 are connected in series, a second series body in which two switching elements of V21 and V22 are connected in series and a third series body in which two switching elements of V31 and V32 are connected in series, and the switch group circuit of the upper arm is configured so that the three series bodies of the first to third series bodies are connected parallel by the main circuit conductors, and the switch group circuit of the lower arm, which is the other phase of the single-phase inverter, has a first series body in which two switching elements of Y11 and Y12 are connected in series, a second series body in which two switching elements of Y21 and Y22 are connected in series and a third series body in which two switching elements of Y31 and Y32 are connected in series, and the switch group circuit of the lower arm is configured so that the three series bodies of the first to third series bodies are connected parallel by the main circuit conductors; and a controller that performs switching control of each switching element of the switch group circuits of the single-phase inverter by time division of 1/(M×N), and has a gate command generator that generates a clock with ON and OFF of an output voltage command of the single-phase inverter being a trigger, a switching element U11 and Y11 gate command signal with (2×2(=the number M of series connection)×3 (the number N of parallel connection)) clocks being one cycle and with an ON signal being outputted for a period of (2×3(=the number N of parallel connection)×1(=the number M of series connection−1)+1) clocks and an OFF signal being outputted for a period of [(2×2(=the number M of series connection)×3(=the number N of parallel connection))−(2×3(=the number N of parallel connection)×1(=the number M of series connection−1)+1)] clocks, a switching element X11 and V11 gate command signal that is delayed by 1 clock with respect to the switching element U11 and Y11 gate command signal and has the same ON and OFF periods as ON and OFF periods of the switching element U11 and Y11 gate command signal, a switching element U21 and Y21 gate command signal that is delayed by 1 clock with respect to the switching element X11 and V11 gate command signal and has the same ON and OFF periods as ON and OFF periods of the switching element X11 and V11 gate command signal, a switching element X21 and V21 gate command signal that is delayed by 1 clock with respect to the switching element U21 and Y21 gate command signal and has the same ON and OFF periods as ON and OFF periods of the switching element U21 and Y21 gate command signal, a switching element U31 and Y31 gate command signal that is delayed by 1 clock with respect to the switching element X21 and V21 gate command signal and has the same ON and OFF periods as ON and OFF periods of the switching element X21 and V21 gate command signal, a switching element X31 and V31 gate command signal that is delayed by 1 clock with respect to the switching element U31 and Y31 gate command signal and has the same ON and OFF periods as ON and OFF periods of the switching element U31 and Y31 gate command signal, a switching element U12 and Y12 gate command signal that is delayed by 1 clock with respect to the switching element X31 and V31 gate command signal and has the same ON and OFF periods as ON and OFF periods of the switching element X31 and V31 gate command signal, a switching element X12 and V12 gate command signal that is delayed by 1 clock with respect to the switching element U12 and Y12 gate command signal and has the same ON and OFF periods as ON and OFF periods of the switching element U12 and Y12 gate command signal, a switching element U22 and Y22 gate command signal that is delayed by 1 clock with respect to the switching element X12 and V12 gate command signal and has the same ON and OFF periods as ON and OFF periods of the switching element X12 and V12 gate command signal, a switching element X22 and V22 gate command signal that is delayed by 1 clock with respect to the switching element U22 and Y22 gate command signal and has the same ON and OFF periods as ON and OFF periods of the switching element U22 and Y22 gate command signal, a switching element U32 and Y32 gate command signal that is delayed by 1 clock with respect to the switching element X22 and V22 gate command signal and has the same ON and OFF periods as ON and OFF periods of the switching element X22 and V22 gate command signal, and a switching element X32 and V32 gate command signal that is delayed by 1 clock with respect to the switching element U32 and Y32 gate command signal and has the same ON and OFF periods as ON and OFF periods of the switching element U32 and Y32 gate command signal, and wherein each of the switching elements is ON/OFF-controlled by each of the generated gate command signals.

2. A resonant load power conversion device having a single-phase inverter whose DC input side is connected to a DC voltage source and whose output side is connected to a resonant load and which outputs a rectangular wave voltage at resonance frequency, comprising:

switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors; and a controller that performs switching control of each switching element of the switch group circuits of the single-phase inverter by time division of 1/(M×N), and wherein each of the N series bodies in each switch group circuit is formed by a module, and the M switching elements in each series body are connected inside the module.

3. A resonant load power conversion device having a single-phase inverter whose DC input side is connected to a DC voltage source and whose output side is connected to a resonant load and which outputs a rectangular wave voltage at resonance frequency, comprising:

switch group circuits that are connected to respective upper and lower arms of one phase of the single-phase inverter and the other phase of the single-phase inverter, each of the switch group circuits being configured so that n (n=an integer of 2 or more) series bodies each having m (m=an integer of 2 or more) switching elements are connected parallel by main circuit conductors, and wherein, the switch group circuit of the upper arm, which is the one phase of the single-phase inverter, has a first series body in which m switching elements of U11 to U1m are connected in series, . . . and an nth series body in which m switching elements of Un1 to Unm are connected in series, and the switch group circuit of the upper arm is configured so that the n series bodies of the first to nth series bodies are connected parallel by the main circuit conductors, the switch group circuit of the lower arm, which is the one phase of the single-phase inverter, has a first series body in which m switching elements of X11 to X1m are connected in series, . . . and an nth series body in which m switching elements of Xn1 to Xnm are connected in series, and the switch group circuit of the lower arm is configured so that the n series bodies of the first to nth series bodies are connected parallel by the main circuit conductors, the switch group circuit of the upper arm, which is the other phase of the single-phase inverter, has a first series body in which m switching elements of V11 to V1m are connected in series, . . . and an nth series body in which m switching elements of Vn1 to Vnm are connected in series, and the switch group circuit of the upper arm is configured so that the n series bodies of the first to nth series bodies are connected parallel by the main circuit conductors, and the switch group circuit of the lower arm, which is the other phase of the single-phase inverter, has a first series body in which m switching elements of Y11 to Y1m are connected in series, . . . and an nth series body in which m switching elements of Yn1 to Ynm are connected in series, and the switch group circuit of the lower arm is configured so that the n series bodies of the first to nth series bodies are connected parallel by the main circuit conductors; and a controller that performs switching control of each switching element of the switch group circuits of the single-phase inverter by time division of 1/(m×n), and has a gate command generator that generates a clock with ON and OFF of an output voltage command of the single-phase inverter being a trigger, a switching element U11 and Y11 gate command signal U11_gate/Y11_gate with (2×the number M of series connection×the number N of parallel connection (M, N=an integer of 2 or more)) clocks being one cycle and with an ON signal being outputted for a period of (2×the number N of parallel connection×(the number M of series connection−1)+1) clocks and an OFF signal being outputted for a period of [(2×the number M of series connection×the number N of parallel connection)−(2×the number N of parallel connection×(the number M of series connection−1)+1)] clocks, a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate, a switching element U21 and Y21 gate command signal U21_gate/Y21_gate that is delayed by 1 clock with respect to the gate command signal X11_gate/V11_gate and has the same ON and OFF periods as ON and OFF periods of the gate command signal X11_gate/V11_gate, a switching element X21 and V21 gate command signal X21_gate/V21_gate that is delayed by 1 clock with respect to the gate command signal U21_gate/Y21_gate and has the same ON and OFF periods as ON and OFF periods of the gate command signal U21_gate/Y21_gate,

.
.
.

a switching element Un1 and Yn1 gate command signal Un1_gate/Yn1_gate that is delayed by 1 clock with respect to a gate command signal X(n−1)1_gate/V(n−1)1_gate and has the same ON and OFF periods as ON and OFF periods of the gate command signal X(n−1)1_gate/V(n−1)1_gate, a switching element Xn1 and Vn1 gate command signal Xn1_gate/Vn1_gate that is delayed by 1 clock with respect to the gate command signal Un1_gate/Yn1_gate and has the same ON and OFF periods as ON and OFF periods of the gate command signal Un1_gate/Yn1_gate, a switching element U12 and Y12 gate command signal U12_gate/Y12_gate that is delayed by 1 clock with respect to the gate command signal Xn1_gate/Vn1_gate and has the same ON and OFF periods as ON and OFF periods of the gate command signal Xn1_gate/Vn1_gate, a switching element X12 and V12 gate command signal X12_gate/V12_gate that is delayed by 1 clock with respect to the gate command signal U12_gate/Y12_gate and has the same ON and OFF periods as ON and OFF periods of the gate command signal U12_gate/Y12_gate, a switching element U22 and Y22 gate command signal U22_gate/Y22_gate that is delayed by 1 clock with respect to the gate command signal X12_gate/V12_gate and has the same ON and OFF periods as ON and OFF periods of the gate command signal X12_gate/V12_gate, a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate,

.
.
.

a switching element Un2 and Yn2 gate command signal Un2_gate/Yn2_gate that is delayed by 1 clock with respect to a gate command signal X(n−1)2_gate/V(n−1)2_gate and has the same ON and OFF periods as ON and OFF periods of the gate command signal X(n−1)2_gate/V(n−1)2_gate, a switching element Xn2 and Vn2 gate command signal Xn2_gate/Vn2_gate that is delayed by 1 clock with respect to the gate command signal Un2_gate/Yn2_gate and has the same ON and OFF periods as ON and OFF periods of the gate command signal Un2_gate/Yn2_gate,

.
.
.

a switching element Unm and Ynm gate command signal Unm_gate/Ynm_gate that is delayed by 1 clock with respect to a gate command signal X(n−1)m_gate/V(n−1)m_gate and has the same ON and OFF periods as ON and OFF periods of the gate command signal X(n−1)m_gate/V(n−1)m_gate, and a switching element Xnm and Vnm gate command signal Xnm_gate/Vnm_gate that is delayed by 1 clock with respect to the gate command signal Unm_gate/Ynm_gate and has the same ON and OFF periods as ON and OFF periods of the gate command signal Unm_gate/Ynm_gate, and wherein each of the switching elements is ON/OFF-controlled by each of the generated gate command signals.

4. A time division operation method of a resonant load power conversion device having a single-phase inverter whose DC input side is connected to a DC voltage source and whose output side is connected to a resonant load and which outputs a rectangular wave voltage at resonance frequency, the resonant load power conversion device including:

switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein, the switch group circuit of the upper arm, which is the one phase of the single-phase inverter, has a first series body in which two switching elements of U11 and U12 are connected in series, a second series body in which two switching elements of U21 and U22 are connected in series and a third series body in which two switching elements of U31 and U32 are connected in series, and the switch group circuit of the upper arm is configured so that the three series bodies of the first to third series bodies are connected parallel by the main circuit conductors, the switch group circuit of the lower arm, which is the one phase of the single-phase inverter, has a first series body in which two switching elements of X11 and X12 are connected in series, a second series body in which two switching elements of X21 and X22 are connected in series and a third series body in which two switching elements of X31 and X32 are connected in series, and the switch group circuit of the lower arm is configured so that the three series bodies of the first to third series bodies are connected parallel by the main circuit conductors, the switch group circuit of the upper arm, which is the other phase of the single-phase inverter, has a first series body in which two switching elements of V11 and V12 are connected in series, a second series body in which two switching elements of V21 and V22 are connected in series and a third series body in which two switching elements of V31 and V32 are connected in series, and the switch group circuit of the upper arm is configured so that the three series bodies of the first to third series bodies are connected parallel by the main circuit conductors, and the switch group circuit of the lower arm, which is the other phase of the single-phase inverter, has a first series body in which two switching elements of Y11 and Y12 are connected in series, a second series body in which two switching elements of Y21 and Y22 are connected in series and a third series body in which two switching elements of Y31 and Y32 are connected in series, and the switch group circuit of the lower arm is configured so that the three series bodies of the first to third series bodies are connected parallel by the main circuit conductors; and a controller that performs switching control of each switching element of the switch group circuits of the single-phase inverter by time division of 1/(M×N), the time division operation method comprising:

step of generating, by the controller, a clock with ON and OFF of an output voltage command of the single-phase inverter being a trigger, a switching element U11 and Y11 gate command signal with (2×2(=the number M of series connection)×3 (the number N of parallel connection)) clocks being one cycle and with an ON signal being outputted for a period of (2×3(=the number N of parallel connection)×1(=the number M of series connection−1)+1) clocks and an OFF signal being outputted for a period of [(2×2(=the number M of series connection)×3(=the number N of parallel connection))−(2×3(=the number N of parallel connection)×1(=the number M of series connection−1)+1)] clocks, a switching element X11 and V11 gate command signal that is delayed by 1 clock with respect to the switching element U11 and Y11 gate command signal and has the same ON and OFF periods as ON and OFF periods of the switching element U11 and Y11 gate command signal, a switching element U21 and Y21 gate command signal that is delayed by 1 clock with respect to the switching element X11 and V11 gate command signal and has the same ON and OFF periods as ON and OFF periods of the switching element X11 and V11 gate command signal, a switching element X21 and V21 gate command signal that is delayed by 1 clock with respect to the switching element U21 and Y21 gate command signal and has the same ON and OFF periods as ON and OFF periods of the switching element U21 and Y21 gate command signal, a switching element U31 and Y31 gate command signal that is delayed by 1 clock with respect to the switching element X21 and V21 gate command signal and has the same ON and OFF periods as ON and OFF periods of the switching element X21 and V21 gate command signal, a switching element X31 and V31 gate command signal that is delayed by 1 clock with respect to the switching element U31 and Y31 gate command signal and has the same ON and OFF periods as ON and OFF periods of the switching element U31 and Y31 gate command signal, a switching element U12 and Y12 gate command signal that is delayed by 1 clock with respect to the switching element X31 and V31 gate command signal and has the same ON and OFF periods as ON and OFF periods of the switching element X31 and V31 gate command signal, a switching element X12 and V12 gate command signal that is delayed by 1 clock with respect to the switching element U12 and Y12 gate command signal and has the same ON and OFF periods as ON and OFF periods of the switching element U12 and Y12 gate command signal, a switching element U22 and Y22 gate command signal that is delayed by 1 clock with respect to the switching element X12 and V12 gate command signal and has the same ON and OFF periods as ON and OFF periods of the switching element X12 and V12 gate command signal, a switching element X22 and V22 gate command signal that is delayed by 1 clock with respect to the switching element U22 and Y22 gate command signal and has the same ON and OFF periods as ON and OFF periods of the switching element U22 and Y22 gate command signal, a switching element U32 and Y32 gate command signal that is delayed by 1 clock with respect to the switching element X22 and V22 gate command signal and has the same ON and OFF periods as ON and OFF periods of the switching element X22 and V22 gate command signal, and a switching element X32 and V32 gate command signal that is delayed by 1 clock with respect to the switching element U32 and Y32 gate command signal and has the same ON and OFF periods as ON and OFF periods of the switching element U32 and Y32 gate command signal; and step of ON/OFF-controlling each of the switching elements by each of the generated gate command signals.

5. A time division operation method of a resonant load power conversion device having a single-phase inverter whose DC input side is connected to a DC voltage source and whose output side is connected to a resonant load and which outputs a rectangular wave voltage at resonance frequency, the resonant load power conversion device including:

switch group circuits that are connected to respective upper and lower arms of one phase of the single-phase inverter and the other phase of the single-phase inverter, each of the switch group circuits being configured so that N (N=an integer of 2 or more) series bodies each having M (M=an integer of 2 or more) switching elements are connected parallel by main circuit conductors, and wherein each of the N series bodies in each switch group circuit is formed by a module, and the M switching elements in each series body are connected inside the module, the time division operation method comprising:

step of performing switching control of each switching element of the switch group circuits of the single-phase inverter by time division of 1/(M×N) by a controller.

6. A time division operation method of a resonant load power conversion device having a single-phase inverter whose DC input side is connected to a DC voltage source and whose output side is connected to a resonant load and which outputs a rectangular wave voltage at resonance frequency, the resonant load power conversion device including:

switch group circuits that are connected to respective upper and lower arms of one phase of the single-phase inverter and the other phase of the single-phase inverter, each of the switch group circuits being configured so that n (n=an integer of 2 or more) series bodies each having m (m=an integer of 2 or more) switching elements are connected parallel by main circuit conductors, and wherein, the switch group circuit of the upper arm, which is the one phase of the single-phase inverter, has a first series body in which m switching elements of U11 to U1m are connected in series, . . . and an nth series body in which m switching elements of Un1 to Unm are connected in series, and the switch group circuit of the upper arm is configured so that the n series bodies of the first to nth series bodies are connected parallel by the main circuit conductors, the switch group circuit of the lower arm, which is the one phase of the single-phase inverter, has a first series body in which m switching elements of X11 to X1m are connected in series, . . . and an nth series body in which m switching elements of Xn1 to Xnm are connected in series, and the switch group circuit of the lower arm is configured so that the n series bodies of the first to nth series bodies are connected parallel by the main circuit conductors, the switch group circuit of the upper arm, which is the other phase of the single-phase inverter, has a first series body in which m switching elements of V11 to V1m are connected in series, . . . and an nth series body in which m switching elements of Vn1 to Vnm are connected in series, and the switch group circuit of the upper arm is configured so that the n series bodies of the first to nth series bodies are connected parallel by the main circuit conductors, and the switch group circuit of the lower arm, which is the other phase of the single-phase inverter, has a first series body in which m switching elements of Y11 to Y1m are connected in series, . . . and an nth series body in which m switching elements of Yn1 to Ynm are connected in series, and the switch group circuit of the lower arm is configured so that the n series bodies of the first to nth series bodies are connected parallel by the main circuit conductors, the time division operation method comprising:

step of performing switching control of each switching element of the switch group circuits of the single-phase inverter by time division of 1/(m×n) by a controller;

step of generating, by a gate command generator, a clock with ON and OFF of an output voltage command of the single-phase inverter being a trigger, a switching element U11 and Y11 gate command signal U11_gate/Y11_gate with (2×the number M of series connection×the number N of parallel connection (M, N=an integer of 2 or more)) clocks being one cycle and with an ON signal being outputted for a period of (2×the number N of parallel connection×(the number M of series connection−1)+1) clocks and an OFF signal being outputted for a period of [(2×the number M of series connection×the number N of parallel connection)−(2×the number N of parallel connection×(the number M of series connection−1)+1)] clocks, a switching element X11 and V11 gate command signal X11_gate/V11_gate that is delayed by 1 clock with respect to the gate command signal U11_gate/Y11_gate and has the same ON and OFF periods as ON and OFF periods of the gate command signal U11_gate/Y11_gate, a switching element U21 and Y21 gate command signal U21_gate/Y21_gate that is delayed by 1 clock with respect to the gate command signal X11_gate/V11_gate and has the same ON and OFF periods as ON and OFF periods of the gate command signal X11_gate/V11_gate, a switching element X21 and V21 gate command signal X21_gateV21_gate that is delayed by 1 clock with respect to the gate command signal U21_gate/Y21_gate and has the same ON and OFF periods as ON and OFF periods of the gate command signal U21_gate/Y21_gate,

.
.
.

a switching element Un1 and Yn1 gate command signal Un1_gate/Yn1_gate that is delayed by 1 clock with respect to a gate command signal X(n−1)1_gate/V(n−1)1_gate and has the same ON and OFF periods as ON and OFF periods of the gate command signal X(n−1)1_gate/V(n−1)1_gate, a switching element Xn1 and Vn1 gate command signal Xn1_gate/Vn1_gate that is delayed by 1 clock with respect to the gate command signal Un1_gate/Yn1_gate and has the same ON and OFF periods as ON and OFF periods of the gate command signal Un1_gate/Yn1_gate, a switching element U12 and Y12 gate command signal U12_gate/Y12_gate that is delayed by 1 clock with respect to the gate command signal Xn1_gate/Vn1_gate and has the same ON and OFF periods as ON and OFF periods of the gate command signal Xn1_gate/Vn1_gate, a switching element X12 and V12 gate command signal X12_gate/V12_gate that is delayed by 1 clock with respect to the gate command signal U12_gate/

Y12_gate and has the same ON and OFF periods as ON and OFF periods of the gate command signal U12_gate/Y12_gate, a switching element U22 and Y22 gate command signal U22_gate/Y22_gate that is delayed by 1 clock with respect to the gate command signal X12_gate/V12_gate and has the same ON and OFF periods as ON and OFF periods of the gate command signal X12_gate/V12_gate, a switching element X22 and V22 gate command signal X22_gate/V22_gate that is delayed by 1 clock with respect to the gate command signal U22_gate/Y22_gate and has the same ON and OFF periods as ON and OFF periods of the gate command signal U22_gate/Y22_gate,

.
.
.

a switching element Un2 and Yn2 gate command signal Un2_gate/Yn2_gate that is delayed by 1 clock with respect to a gate command signal X(n−1)2_gate/V(n−1)2_gate and has the same ON and OFF periods as ON and OFF periods of the gate command signal X(n−1)2_gate/V(n−1)2_gate, a switching element Xn2 and Vn2 gate command signal Xn2_gate/Vn2_gate that is delayed by 1 clock with respect to the gate command signal Un2_gate/Yn2_gate and has the same ON and OFF periods as ON and OFF periods of the gate command signal Un2_gate/Yn2_gate,

.
.
.

a switching element Unm and Ynm gate command signal Unm_gate/Ynm_gate that is delayed by 1 clock with respect to a gate command signal X(n−1)m_gate/V(n−1)m_gate and has the same ON and OFF periods as ON and OFF periods of the gate command signal X(n−1)m_gate/V(n−1)m_gate, and a switching element Xnm and Vnm gate command signal Xnm_gate/Vnm_gate that is delayed by 1 clock with respect to the gate command signal Unm_gate/Ynm_gate and has the same ON and OFF periods as ON and OFF periods of the gate command signal Unm_gate/Ynm_gate; and step of ON/OFF-controlling each of the switching elements by each of the generated gate command signals.

* * * * *